US012786907B2

(12) United States Patent
Cheng et al.

(10) Patent No.: US 12,786,907 B2
(45) Date of Patent: Nov. 3, 2026

(54) METHOD OF NON-TERRESTRIAL NETWORK COMMUNICATION AND USER EQUIPMENT USING THE SAME

(71) Applicant: Industrial Technology Research Institute, Hsinchu (TW)

(72) Inventors: Ching-Wen Cheng, Hsinchu County (TW); Fang-Ching Ren, Hsinchu City (TW)

(73) Assignee: Industrial Technology Research Institute, Hsinchu (TW)

( * ) Notice: Subject to any disclaimer, the term of this patent is extended or adjusted under 35 U.S.C. 154(b) by 341 days.

(21) Appl. No.: 18/501,045

(22) Filed: Nov. 3, 2023

(65) Prior Publication Data

US 2024/0155522 A1 May 9, 2024

Related U.S. Application Data

(60) Provisional application No. 63/422,449, filed on Nov. 4, 2022.

(51) Int. Cl.
*H04W 56/00* (2009.01)
*H04W 36/00* (2009.01)

(52) U.S. Cl.
CPC ... *H04W 56/0015* (2013.01); *H04W 36/0061* (2013.01); *H04W 56/0045* (2013.01)

(58) Field of Classification Search
CPC ........... H04W 56/0045; H04W 5/0015; H04W 36/0061
See application file for complete search history.

(56) References Cited

U.S. PATENT DOCUMENTS 3,611,435 A 10/1971 Cooper
6,577,872 B1 6/2003 Lundh et al.
(Continued)

FOREIGN PATENT DOCUMENTS

| | | |
|---|---|---|
| CN | 113271167 | 8/2021 |
| CN | 115767646 | 3/2023 |
| TW | 202315444 | 4/2023 |
| WO | 2022079692 | 4/2022 |
| WO | 2022205014 | 10/2022 |

OTHER PUBLICATIONS

"Office Action of Taiwan Counterpart Application", issued on Feb. 27, 2024, p. 1-p. 45.
(Continued)

*Primary Examiner* — Elton Williams
(74) *Attorney, Agent, or Firm* — JCIPRNET

(57) ABSTRACT

A method of non-terrestrial network (NTN) communication and a user equipment (UE) using the same method are provided. The method includes: receiving a cell change command comprising re-synchronization information; and performing a re-synchronization procedure according to the re-synchronization information, wherein the re-synchronization information comprising at least one of the following: a re-synchronization time; ephemeris information associated with a target cell; timing advance adjustment information associated with the target cell; a timing advance command value associated with the target cell; and a re-synchronization indication for indicating the UE to perform the re-synchronization procedure, wherein the re-synchronization procedure comprises a downlink re-synchronization procedure.

38 Claims, 16 Drawing Sheets

(56) References Cited

U.S. PATENT DOCUMENTS

| | | | | |
|---|---|---|---|---|
| 9,820,244 | B2 | 11/2017 | Earnshaw et al. | |
| 10,785,656 | B2 | 9/2020 | Ang et al. | |
| 11,362,921 | B2 | 6/2022 | Bhushan et al. | |
| 11,546,052 | B2 | 1/2023 | Wang et al. | |
| 11,558,786 | B2 | 1/2023 | Shrestha et al. | |
| 2016/0323800 | A1* | 11/2016 | Ulupinar | H04B 7/1851 |
| 2022/0086715 | A1* | 3/2022 | Hong | H04B 7/2041 |
| 2022/0345961 | A1* | 10/2022 | Tao | H04W 36/0077 |
| 2023/0022834 | A1* | 1/2023 | Wu | H04W 36/0005 |
| 2023/0133633 | A1* | 5/2023 | Park | H04B 7/18513 370/331 |
| 2024/0031965 | A1 | 1/2024 | Wu | |

OTHER PUBLICATIONS

OPPO, "Discussion on neighbour cell's epoch time and Koffset's ambiguity issue", 33GPP TSG-RAN WG2 Meeting #118-e, R2-2204714, May 9-20, 2022, pp. 1-2.
Apple, "The impact on HO by the validity of the UL sync assistance info", 3GPP TSG-RAN WG2 Meeting #119e, R2-2207441, Aug. 17-29, 2022, pp. 1-5.
Panasonic, "Bandwidth part operations during handover", 3GPP TSG-RAN WGI Meeting #92, R1-1802800, Feb. 26-Mar. 2, 2018, pp. 1-3.
"Search Report of Europe Counterpart Application", issued on Mar. 28, 2024, p. 1-p. 11.

* cited by examiner

METHOD OF NON-TERRESTRIAL NETWORK COMMUNICATION AND USER EQUIPMENT USING THE SAME

CROSS-REFERENCE TO RELATED APPLICATION

This application claims the priority benefit of U.S. provisional application Ser. No. 63/422,449, filed on Nov. 4, 2022. The entirety of the above-mentioned patent application is hereby incorporated by reference herein and made a part of this specification.

BACKGROUND

Technical Field

The disclosure is related to a method of non-terrestrial network (NTN) communication and a user equipment (UE) using the same method.

Description of Related Art

In NTN communication, the mobility of the serving satellite makes the UE have to perform handovers frequently. The interruption time for the handover (HO) may be extended due to high propagation delay. On the other hand, satellite mobility may bring significant signaling overhead cause by bursty handover. The significant signaling overhead of handover configuration may impact the efficiency of radio resource for user data transmission. In order to reduce the handover interruption time and the signaling overhead, a method for NTN communication is required.

SUMMARY

The disclosure is directed to a method of NTN communication and a UE using the same method.

A method of non-terrestrial network communication, adapted to a user equipment (UE), wherein the method including: receiving a cell change command including re-synchronization information; and performing a re-synchronization procedure according to the re-synchronization information, wherein the re-synchronization information comprising at least one of the following: a re-synchronization time; ephemeris information associated with a target cell; timing advance adjustment information associated with the target cell; a timing advance command value associated with the target cell; and a re-synchronization indication for indicating the UE to perform the re-synchronization procedure, wherein the re-synchronization procedure comprises a downlink re-synchronization procedure.

In one embodiment of the present disclosure, the re-synchronization time including at least one of the following: a configuration for a timer, a starting time, a starting time and a time period, and a starting time and a stopping time.

In one embodiment of the present disclosure, the cell change command is transmitted to the UE via one of a broadcast signaling and a dedicated signaling for the UE.

In one embodiment of the present disclosure, the re-synchronization information comprises a configuration of downlink reference signal, wherein performing the re-synchronization procedure according to the re-synchronization information including one of the following: upon receiving the re-synchronization information, performing a downlink re-synchronization procedure according to a configuration of downlink reference signal indicated by the re-synchronization information, and the configuration of downlink reference signal indicated by the re-synchronization information is an indicated downlink reference signal; in response to the re-synchronization information including a re-synchronization indication, performing the downlink re-synchronization procedure according to a downlink reference signal associated with a serving cell, and the downlink reference signal associated with the serving cell is an indicated downlink reference signal; and performing the downlink re-synchronization procedure according to the indicated downlink reference signal, wherein the indicated downlink reference signal is received no earlier than a re-synchronization time indicated by the re-synchronization information.

In one embodiment of the present disclosure, the re-synchronization information comprises a configuration of downlink reference signal, wherein performing the re-synchronization procedure according to the re-synchronization information including: monitoring a synchronization signal block (SSB) according to a configuration of downlink reference signal indicated by the re-synchronization information so as to be downlink synchronized in time domain and frequency domain based on a primary synchronization signal and a secondary synchronization signal of the synchronization signal block.

In one embodiment of the present disclosure, performing the re-synchronization procedure further including: performing an uplink re-synchronization procedure after completing a downlink re-synchronization procedure.

In one embodiment of the present disclosure, the re-synchronization information comprises a configuration of downlink reference signal, wherein performing the uplink re-synchronization procedure including at least one of the following: performing a random access procedure according to a random access resource associated with an indicated downlink reference signal; and sending an uplink signal through a physical uplink control channel or a physical uplink shared channel according to a configuration associated with the indicated downlink reference signal.

In one embodiment of the present disclosure, performing the re-synchronization procedure including at least one of the following: stopping performing a beam failure detection associated with a source cell and a target cell correspondingly; and stopping performing a radio link failure detection associated with the source cell and the target cell correspondingly.

In one embodiment of the present disclosure, the method further including: receiving a bandwidth adaptation configuration before receiving the cell change command.

In one embodiment of the present disclosure, the bandwidth adaptation configuration including at least one of the following: a transition bandwidth part configuration; a configuration of downlink reference signal associated with a transition bandwidth part, wherein the configuration of downlink reference signal indicates a frequency and time location and subcarrier spacing associated with a downlink reference signal; a bandwidth part identifier; a bandwidth part recovery time; a timing difference between a serving cell and a target cell; a serving cell configuration; a cell radio network temporary identifier of the UE; and a UE specific bandwidth part configuration including at least one of a configuration of downlink bandwidth part and a configuration of uplink bandwidth part.

In one embodiment of the present disclosure, performing the re-synchronization procedure according to the re-synchronization information including: in response to both the configuration of downlink reference signal associated with the transition bandwidth part and a configuration of downlink reference signal included in the cell change command being configured to the UE, performing the re-synchronization procedure according to the configuration of downlink reference signal associated with the transition bandwidth part.

In one embodiment of the present disclosure, performing the re-synchronization procedure according to the re-synchronization information including: performing the re-synchronization procedure according to the configuration of downlink reference signal included in the cell change command, applying the bandwidth part configuration associated with the bandwidth part identifier indicated in the bandwidth adaptation configuration if the UE performing the re-synchronization procedure according to the configuration of downlink reference signal included in the cell change command.

In one embodiment of the present disclosure, the transition bandwidth part configuration includes a configuration of downlink transition bandwidth part and a configuration of uplink transition bandwidth part.

In one embodiment of the present disclosure, the configuration of downlink transition bandwidth part including at least one of the following: a bandwidth part identifier; a frequency and time location and a bandwidth of a bandwidth part, wherein the bandwidth part is configured to use a subset of the total cell bandwidth of the corresponding cell; information of subcarrier space to be adopted in a bandwidth part; a control resource set for monitoring a random access response; a control resource set for monitoring a physical downlink control channel, and a control resource set for monitoring a physical downlink shared channel.

In one embodiment of the present disclosure, the configuration of uplink transition bandwidth part including at least one of the following: a bandwidth part identifier; a frequency and time location and a bandwidth of a bandwidth part; information of subcarrier space to be adopted in a bandwidth part; a resource configuration of random access channel for transmitting a preamble; a resource configuration of physical uplink control channel transmission; and a resource configuration of physical uplink shared channel transmission.

In one embodiment of the present disclosure, performing the re-synchronization procedure according to the re-synchronization information including: applying the transition bandwidth part configuration after performing the re-synchronization procedure according to the configuration of downlink reference signal associated with the transition bandwidth part if the UE performing the re-synchronization procedure according to the configuration of downlink reference signal associated with the transition bandwidth part.

In one embodiment of the present disclosure, performing the re-synchronization procedure according to the re-synchronization information including: performing the re-synchronization procedure according to configuration of downlink reference signal associated with the bandwidth part identifier indicated in the bandwidth adaptation configuration, applying the bandwidth part configuration associated with the bandwidth part identifier indicated in the bandwidth adaptation configuration.

In one embodiment of the present disclosure, the method further including one of the following: applying a bandwidth part configuration before performing the re-synchronization procedure, and resuming the bandwidth part configuration after completing the re-synchronization procedure according to a bandwidth part recovery time indicated by the bandwidth adaptation configuration, wherein the resuming may be implemented by storing the bandwidth part configuration which is applied before performing the re-synchronization procedure and applying the stored bandwidth part configuration after the bandwidth part recovery time; applying the bandwidth part configuration before performing the re-synchronization procedure, and resuming the bandwidth part configuration after receiving a physical downlink control channel addressed to a cell radio network temporary identifier of the UE, wherein the cell radio network temporary identifier is associated with a cell corresponding to the configuration of downlink reference signal indicated by the bandwidth adaptation configuration; applying a UE specific bandwidth part configuration according to the bandwidth part recovery time indicated by the bandwidth adaptation configuration; and applying the UE specific bandwidth part configuration after receiving the physical downlink control channel addressed to the cell radio network temporary identifier of the UE, wherein the cell radio network temporary identifier is associated with the cell corresponding to the configuration of downlink reference signal indicated by the bandwidth adaptation configuration.

In one embodiment of the present disclosure, the method further including: receiving a common target cell configuration before receiving the cell change command.

In one embodiment of the present disclosure, the common target cell configuration including at least one of the following: a synchronization signal block frequency associated with a target cell; a physical cell identifier of a target cell; a configuration of downlink reference signal associated with a downlink bandwidth part; a bandwidth part identifier; a bandwidth part recovery time; and a timing difference between a serving cell and a target cell.

In one embodiment of the present disclosure, performing the re-synchronization procedure according to the re-synchronization information including one of the following: in response to both the synchronization signal block frequency associated with a target cell and a configuration of downlink reference signal associated with a downlink bandwidth part, performing the re-synchronization procedure according to the configuration of downlink reference signal associated with a downlink bandwidth part; and in response to the bandwidth part identifier and a timing difference between a UE measured current time and a stopping time of a transition period being less than a threshold, performing the re-synchronization procedure according to the bandwidth part identifier.

A method of non-terrestrial network communication, adapted to a user equipment (UE), wherein the method including: receiving, via a broadcast signaling, a first handover configuration message from a source cell, wherein the first handover configuration message includes a common target cell configuration for changing a connection of one or more UEs from the source cell to a target cell, timing advance adjustment information associated with the target cell for the UE to adjust a timing advance value for uplink transmission to the target cell, and timestamp information associated with the timing advance adjustment information; receiving, via a UE specific signaling, a second handover configuration message from the source cell, wherein the second handover configuration message includes a UE specific target call configuration for changing the connection(s) of the UE from the source cell to the target cell; and performing a handover procedure to connect to the target cell according to the first handover configuration message and the second handover configuration message.

In one embodiment of the present disclosure, the first handover configuration message including at least one of the following: ephemeris information of the target cell, wherein the ephemeris information includes ephemeris of a satellite embarking a network device of non-terrestrial network to provide non-terrestrial network functions of a non-terrestrial network cell; and a timing difference between the source cell and the target cell (e.g., in the number of frame or subframes, provides the difference of reference timing of the source cell and the target cell to assist UE in downlink synchronization).

In one embodiment of the present disclosure, the second handover configuration message including at least one of the following: a random access resource configuration, a random backoff time of initiating an uplink transmission of a random access procedure to the target cell; a timing advance adjustment value for the UE; a serving cell configuration for the UE; and a cell radio network temporary identifier.

In one embodiment of the present disclosure, the second handover configuration message further includes a handover time for the handover procedure, wherein the handover time is indicated by s system frame number and a subframe number.

In one embodiment of the present disclosure, performing the handover procedure including one of the following: performing the handover procedure upon receiving the second handover configuration message; performing the handover procedure upon a handover time in response to the handover time being indicated by the second handover configuration message; and performing the handover procedure according to a random backoff time in response to the random backoff time being indicated by the second handover configuration message.

In one embodiment of the present disclosure, performing the handover procedure including: receiving, via a broadcast signaling or a unicast signaling, a handover indication from the source cell, wherein the handover indication is used for changing the connection(s) of one or more UEs from the source cell to the target cell; and performing the handover procedure upon receiving the handover indication.

In one embodiment of the present disclosure, the first handover configuration message including at least one of the following: a timing difference between the source cell and the target cell; a transition bandwidth part identifier; a synchronization signal block frequency associated with a transition bandwidth part; a downlink bandwidth part identifier associated with the target cell; a uplink bandwidth part identifier associated with the target cell; a bandwidth part transition period; and a bandwidth part recovery time.

In one embodiment of the present disclosure, the method further including one of the following: performing a bandwidth adaptation with synchronization according to the first handover configuration message; performing a bandwidth adaptation with synchronization according to a starting time of a transition period, and performing the bandwidth adaptation with synchronization according to a bandwidth part transition period.

In one embodiment of the present disclosure, the bandwidth adaptation with synchronization includes a downlink frequency and timing synchronization with a downlink bandwidth part indicated by the first handover configuration message.

In one embodiment of the present disclosure, the method of bandwidth adaptation with synchronization further including: performing an uplink synchronization via a random access procedure on an uplink bandwidth part by utilizing a random access resource associated with the uplink bandwidth part.

In one embodiment of the present disclosure, the method further including one of the following: applying a bandwidth part configuration before performing the handover procedure, and resuming the bandwidth part configuration upon a bandwidth part recovery time indicated by the first handover configuration message; and applying the bandwidth part configuration before performing the handover procedure, and resuming the bandwidth part configuration after receiving a physical downlink control channel addressed to a cell radio network temporary identifier of the UE, wherein the cell radio network temporary identifier is associated with the target cell.

In one embodiment of the present disclosure, the second handover configuration message includes re-synchronization information, and the re-synchronization information includes a re-synchronization indication for a re-synchronization procedure between the UE and the target cell.

In one embodiment of the present disclosure, the method further including one of the following: upon receiving the second handover configuration message, performing the re-synchronization procedure, wherein the re-synchronization procedure is a downlink re-synchronization procedure; performing the re-synchronization procedure according a downlink reference signal, wherein the downlink reference signal is received no earlier than a re-synchronization time indicated by the re-synchronization information; and upon receiving the second handover configuration message, performing the re-synchronization procedure, wherein the re-synchronization procedure includes an uplink re-synchronization procedure.

In one embodiment of the present disclosure, the uplink re-synchronization procedure including one of the following: performing a random access procedure associated with the target cell; and sending an uplink signal through a physical uplink control channel (PUCCH) or a physical uplink shared channel (PUSCH) to the target cell.

In one embodiment of the present disclosure, sending the uplink signal including: sending the uplink signal via an uplink resource, wherein the uplink resource is configured before the UE completing a downlink synchronization procedure with the target cell.

In one embodiment of the present disclosure, the uplink resource is configured by a physical downlink control channel indication from the target cell.

A user equipment (UE), including: a transceiver; and a processor, coupled to the transceiver and configured to: receive a cell change command including re-synchronization information; and perform a re-synchronization procedure according to the re-synchronization information, wherein the re-synchronization information comprising at least one of the following: a re-synchronization time; ephemeris information associated with a target cell; timing advance adjustment information associated with the target cell; a timing advance command value associated with the target cell; and a re-synchronization indication for indicating the UE to perform the re-synchronization procedure, wherein the re-synchronization procedure comprises a downlink re-synchronization procedure.

A user equipment (UE), including: a transceiver; and a processor, coupled to the transceiver and configured to: receive, via a broadcast signaling, a first handover configuration message from a source cell, wherein the first handover configuration message includes a common target cell configuration for changing connection(s) of one or more UEs from the source cell to a target cell, timing advance adjustment information associated with the target cell for the UE to adjust a timing advance value for uplink transmission to the target cell, and timestamp information associated with the timing advance adjustment information; receive, via a UE specific signaling, a second handover configuration message from the source cell, wherein the second handover configuration message includes a UE specific target cell configuration for changing the connection(s) of the UE from the source cell to the target cell; and perform a handover procedure to connect to the target cell according to the second handover configuration message.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
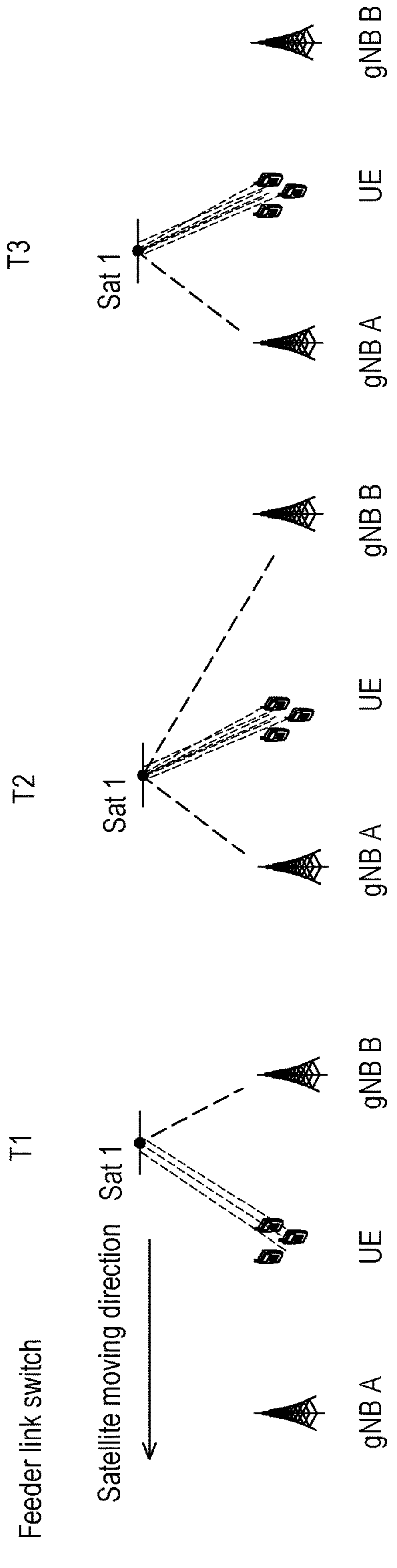
FIG. 1 illustrates a schematic diagram of feeder link switch according to an embodiment of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

An NTN payload may be a network node (e.g., transport network layer (TNL) node) embarked on a satellite or a high-altitude platform station, wherein the NTN payload may provide connectivity functions between the service link and the feeder link.

A quasi-earth-fixed cell may provide beams covering one geographic area for a limited period and a different geographic area during another period (e.g., the case of non-geostationary (NGSO) satellites generating steerable beams).

A transparent NTN payload may transparently forward the radio protocol signal received from the UE (via the service link) to the NTN gateway (GW) (via the feeder link) and vice-versa. A NTN GW is a network node located on earth that has connection been established with at least one gNB and may be co-located with a gNB.

The NGSO satellite would bring about NTN-NTN mobility. When quasi-earth fixed NTN cells are served by transparent NTN payloads, satellite mobility may bring about feeder link change (i.e., the connection between NTN payload and NTN GW changes), as shown in FIG. 1. FIG. 1 illustrates a schematic diagram of feeder link switch according to an embodiment of the present disclosure. At time T1, satellite Sat 1 may forward the signals between the UE and gNB B. After Sat 1 moves for a while, in time T2, Sat1 may forward the signals between the UE and gNB B and may forward the signals between the UE and gNB A. After Sat 1 moves for a while, in time T3, Sat 1 may only forward the signals between the UE and gNB A. The feeder link between Sat 1 and gNB B is switched to the feeder link between Sat 1 and gNB A.

Figure 2:
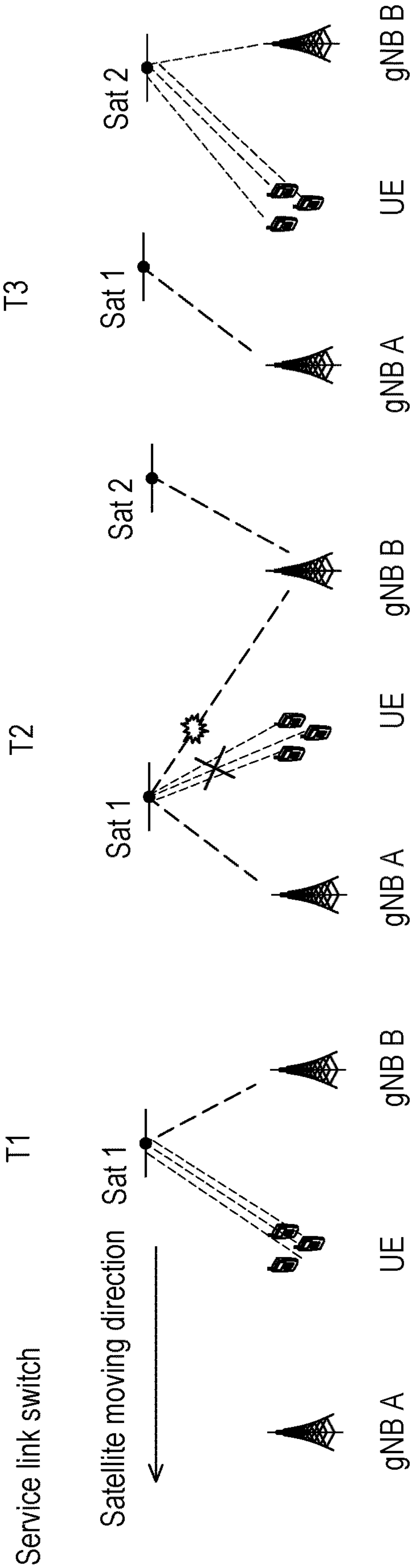
FIG. 2 illustrates a schematic diagram of service link switch according to an embodiment of the present disclosure.

Satellite mobility may also bring about service link change (i.e., the connection between UE and NTN payload changes), as shown in FIG. 2. FIG. 2 illustrates a schematic diagram of service link switch according to an embodiment of the present disclosure. At time T1, the UE is served by satellite Sat 1. Sat 1 may forward the signals between the UE and gNB B. After Sat 1 moves for a while, in time T2, the feeder link between Sat 1 and gNB B can no longer be maintained. Sat 1 may not forward the signals for the UE and gNB B. On the other hand, since satellite Sat 2 moves towards gNB B, a feeder link between Sat 2 and gNB B may be established. After Sat 1 and Sate 2 move for a while, in time T3, the UE may be served by Sat 2. The service link between Sat 1 and the UE can no longer be maintained. That is, the service link provided by Sat 1 is changed.

There are impacts of NTN mobility due to satellite mobility. For quasi-earth fixed use case, the handover due to satellite mobility is bursty. For example, all RRC_CONNECTED NTN UE served by the same NTN cell need to be handed over to a target cell when feeder link or service link change, i.e., all the connections of RRC_CONNECTED NTN UE need to be changed from the source NTN cell to the target cell. Furthermore, satellite mobility may bring about significant signaling overhead caused by bursty handover. The significant signaling overhead of handover configuration may impact the efficiency of radio resource for user data transmission.

In order to solve issues mentioned above, the present disclosure provides a method for the UE in NTN communication. The UE may receive a signaling (e.g., a cell change command such as common target cell configuration, specific target cell configuration, bandwidth adaptation (BA) configuration, or BA command) from the source cell and perform a re-synchronization ("re-synchronization" recited in the present disclosure may be replaced as "synchronization" and vice-versa) procedure or a handover procedure with a target cell according to the signaling.

Figure 3:
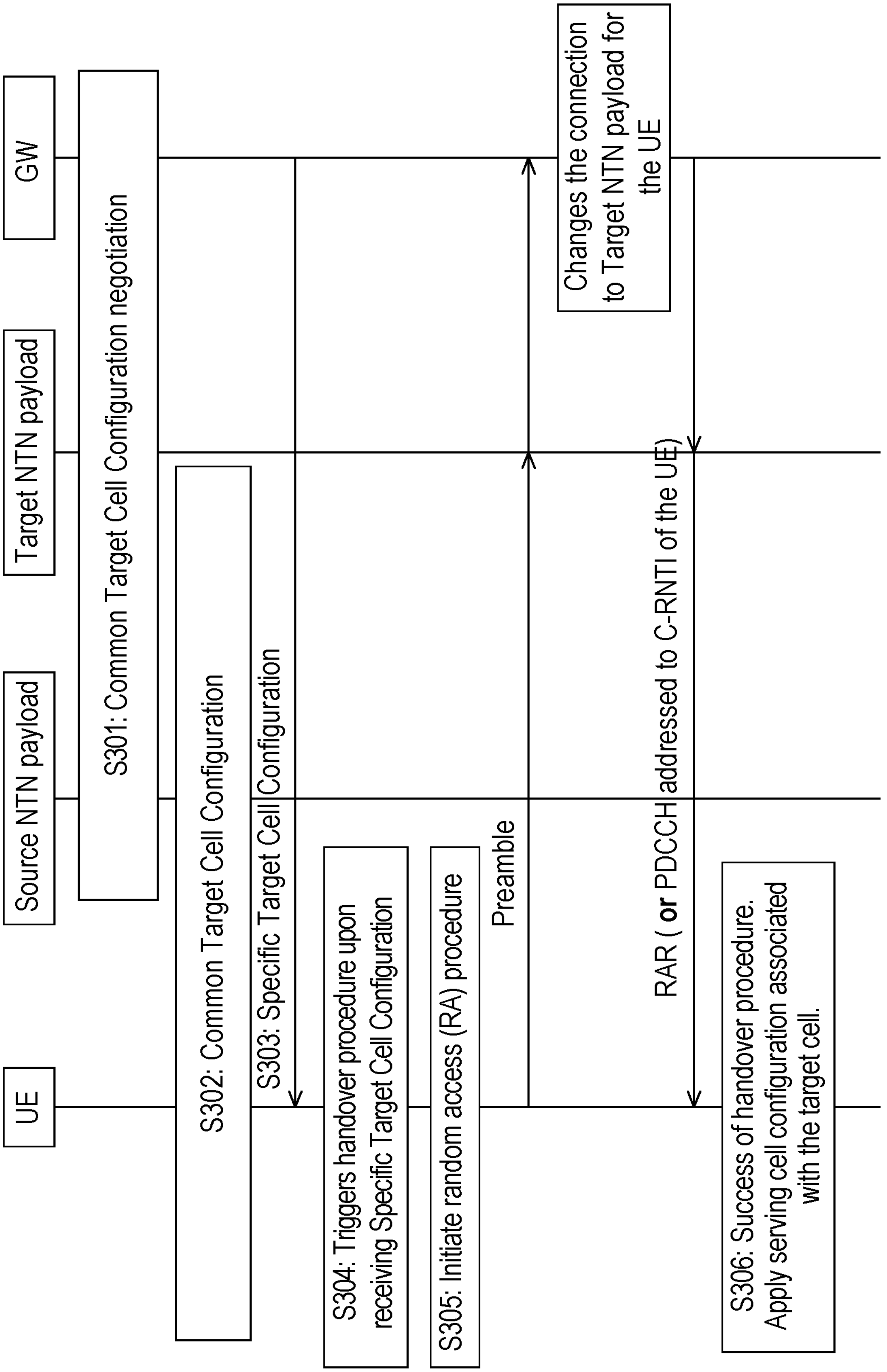
FIG. 3 illustrates a schematic diagram of broadcasting common parameters of target cell according to an embodiment of the present disclosure.

FIG. 3 illustrates a schematic diagram of broadcasting common parameters of target cell according to an embodiment of the present disclosure. In step S301, the source cell (e.g., providing NTN services via source NTN payload) may perform information exchange with a target cell (e.g., providing NTN services via target NTN payload) and/or a GW (e.g., NTN GW or gNB) via an intra-gNB inter-cell procedure or an inter-gNB inter-cell procedure. The source cell may obtain a common target cell configuration associated with the target cell by performing a "Common Target Cell Config negotiation" procedure (e.g., a handover preparation procedure).

In step S302, the source cell may transmit a common target cell configuration including the parameters associated with a target cell that are common to multiple UEs by a broadcast signaling, wherein the broadcast signaling (also referred to as "first handover configuration message") may be transmitted via, for example, a broadcast control channel (BCCH). The common target cell configuration may be used for changing the connection(s) of one or more UEs from the source cell to the target cell.

In one embodiment, the common target cell configuration may be transmitted as a system information block (SIB) (i.e., SIBi, wherein i is the index of the SIB) included in a radio resource control (RRC) message (e.g., SystemInformation message), or in a part of a SIBi included in an RRC message.

In one embodiment, the source cell may transmit an "Obtain Common Target Cell Configuration" indication via a broadcast channel (e.g., paging control channel (PCCH)) to indicate the UE that SIBi is changed and the UE may obtain the common target cell configuration. The "Obtain Common Target Cell Configuration" indication may be implemented by using 1 bit in the short message field for the indication of the SIBi has been changed, wherein the short message field may be transmitted on a physical downlink control channel (PDCCH) addressed to a paging radio network temporary identifier (P-RNTI). The 1 bit in the short message field may not change the value of SystemInfoModification bit in the short message. For example, RRC_IDLE or RRC_INACTIVE UE may not be required to acquire system information according to the change of the 1 bit in the short message field. In one embodiment, an RRC_IDLE or RRC_INACTIVE UE may omit the indication for obtaining the common target cell configuration.

A UE (e.g., RRC_CONNECTED UE) may acquire the common target cell configuration according to the "Obtain Common Target Cell Configuration" indication upon the reception of the "Obtain Common Target Cell Configuration" indication. For example, when the SystemInfoModification bit in the short message field transmitted on the PDCCH addressed to P-RNTI is set to "1", the UE may acquire system information according to the SystemInfoModfication bit and may then obtain the common target cell configuration by acquiring the SIBi of the source cell according to the system information scheduling information included in the SIB1 of the source cell. For another example, when the SystemInfoModfication bit in the short message field transmitted on the PDCCH addressed to P-RNTI is not set to "1", the UE may acquire SIBi according to the validity time of SIBi of the source cell (e.g., UE may not be required to acquire master information block (MIB) and SIB1 according to the reception of the "Obtain Common Target Cell Configuration" indication).

In one embodiment the common target cell configuration may be transmitted for a system information (SI) modification period.

In one embodiment, the common target cell configuration may include information such as a synchronization signal block (SSB) frequency of target cell, a physical cell ID (PCI) of target cell, ephemeris information associated with target cell, common timing advance (TA) adjustment information (e.g., common TA parameters including Kmac, Koffset, or epoch time, wherein the epoch time may be represented as a time stamp) associated with target cell, a parameter $\mathrm{Offset}_{s\_t}$, system information of target cell, or a measurement configuration associated with target cell. The SSB frequency of target cell may indicate the SSB frequency of cell-defining SSB (CD-SSB) associated with target cell. The ephemeris information may be used by the UE to evaluate or adjust the timing advance compensation value to access the target cell. If the ephemeris information is absent in the common target cell configuration and there is no valid ephemeris information associated with the target cell store in the UE, the UE may obtain the ephemeris information from system information of the target cell. If the common TA adjustment information is not provided by the common target cell configuration, the UE may estimate the common TA adjustment information according to the UE location and the ephemeris of the target cell. The parameter $\mathrm{Offset}_{s\_t}$ is the timing difference between the source cell and the target cell (e.g., to be applied as an SSB-based radio resource management measurement timing configuration (synchronization signal (SS)/physical broadcast channel (PBCH) block measurement timing configuration, SMTC) offset). If $\mathrm{Offset}_{s\_t}$ is not provided by the common target cell configuration, the UE may search the SSB of target cell blindly (i.e., without network provided assistance information). The system information of target cell may include at least one of SIB1 through SIB5 or SIB19. The measurement configuration associated with target cell may include cell level and/or beam level measurement configuration (e.g., measurement objects).

In step S303, the source cell may transmit a specific target cell configuration (e.g., "Specific Target Cell Config" message, also referred to as "second handover configuration message") to a RRC_CONNECTED UE for providing UE specific handover configuration to the UE. The specific target cell configuration may be transmitted by a UE specific signaling via, for example, a physical downlink shared channel (PDSCH). The specific target cell configuration may be used for changing the connection(s) of a specific UE from the source cell to the target cell.

In one embodiment, the specific target cell configuration may include information such as a random access (RA) resource configuration associated with target cell (e.g., dedicated RA parameters RACH-ConfigDedicated), a serving cell configuration (e.g., ServingCellConfig) associated with target cell, a cell radio network temporary identifier (C-RNTI) associated with target cell, specific TA adjustment information (e.g., UE specific TA parameters such as a TA value) associated with target cell, or a random backoff time $T_{RA\text{-}backoff}$ of initiating a preamble transmission of RA procedure. The serving cell configuration may be a UE specific serving cell configuration to be applied by a UE after the UE successfully completing the RA procedure with the target cell. If the C-RNTI associated with target cell is not provided by the specific target cell configuration, the UE may reuse the C-RNTI provided by the source cell. The UE may perform the handover procedure according to $T_{RA\text{-}backoff}$. For example, the UE may perform a preamble transmission of a RA procedure after $T_{RA\text{-}backoff}$ from the initiation of the preamble transmission attempt.

In one embodiment, if the common target cell configuration has not been obtained by the UE upon the reception of the specific target cell configuration, the UE may be triggered by the specific target cell configuration for acquiring the common target cell configuration. For example, the UE may obtain the common target cell configuration by monitoring the System Information broadcasted by the serving cell (e.g., source cell).

In one embodiment, the UE would take precedence of (i.e., apply) the value of the parameter configured by the specific target cell configuration message if both the common target cell configuration and the specific target cell configuration provide the values of the same parameter (e.g., RA resource configuration or TA adjustment information).

In step S304, the UE may trigger a handover procedure to connect to the target cell. The UE may trigger the handover procedure upon receiving the specific target cell configuration. That is, the UE may trigger the handover procedure according to the UE specific signaling if both the common target cell configuration and specific target cell configuration are received by the UE.

The UE may perform downlink synchronization with the target cell before initiating any uplink transmission to the target cell. The UE may detect and monitor the synchronization signal block (SSB) according to the synchronization signal block frequency to perform the DL frequency synchronization with the target cell and to perform the DL timing and frequency synchronization according to the timing and frequency location of the primary synchronization signal (PSS) and secondary synchronization signal (SSS) of the synchronization signal block.

In step S305, the UE may initiate a RA procedure to inform the target cell of a handover so as to achieve uplink timing synchronization with the target cell. In one embodiment, the UE may perform a preamble transmission after a configured time (e.g., $T_{RA\_backoff}$, if configured) from the initiation of the preamble transmission attempt, in the nearest upcoming random access occasion (RO), in next discontinuous reception (DRX) ON duration, or in a RO selected after a UE determined RA backoff time.

In one embodiment, the UE may transmit the value of TA report (i.e., UE specific TA compensation value) to the target cell in the RA procedure. For example, the UE may transmit the value of the TA report according to an indication included in the first target cell configuration message, or the second target cell configuration message.

In one embodiment, the UE may initiate a RA attempt. For example, the UE may initiate a RA attempt after successfully DL synchronized with the target cell (e.g., the number of consequent in-sync indications received from physical layer protocol of the UE is larger than a threshold).

In one embodiment, the UE may perform an uplink (UL) timing adjustment (e.g., evaluated by the UE the value of timing advance pre-compensation for uplink transmission by applying TA adjustment information associated with target cell, or by the UE location and the ephemeris of target cell) before performing any UL transmission to the target cell.

In step S306, after the UE completing the handover procedure successfully, the UE may apply the serving cell configuration associated with the target cell.

Figure 4:
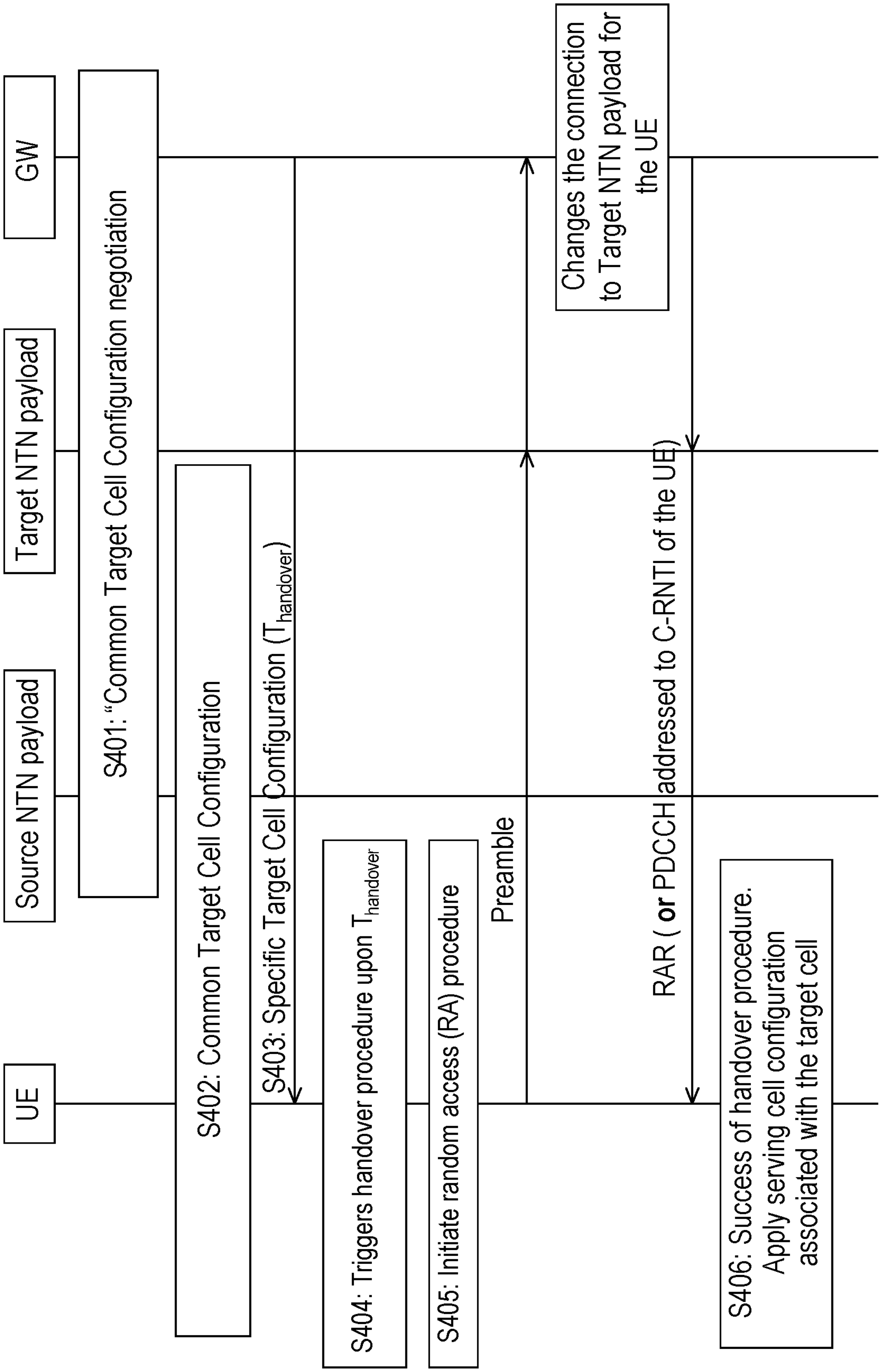
FIG. 4 illustrates a schematic diagram of broadcasting common parameters of target cell with dispersed handover initiation time according to an embodiment of the present disclosure.
Figure 5:
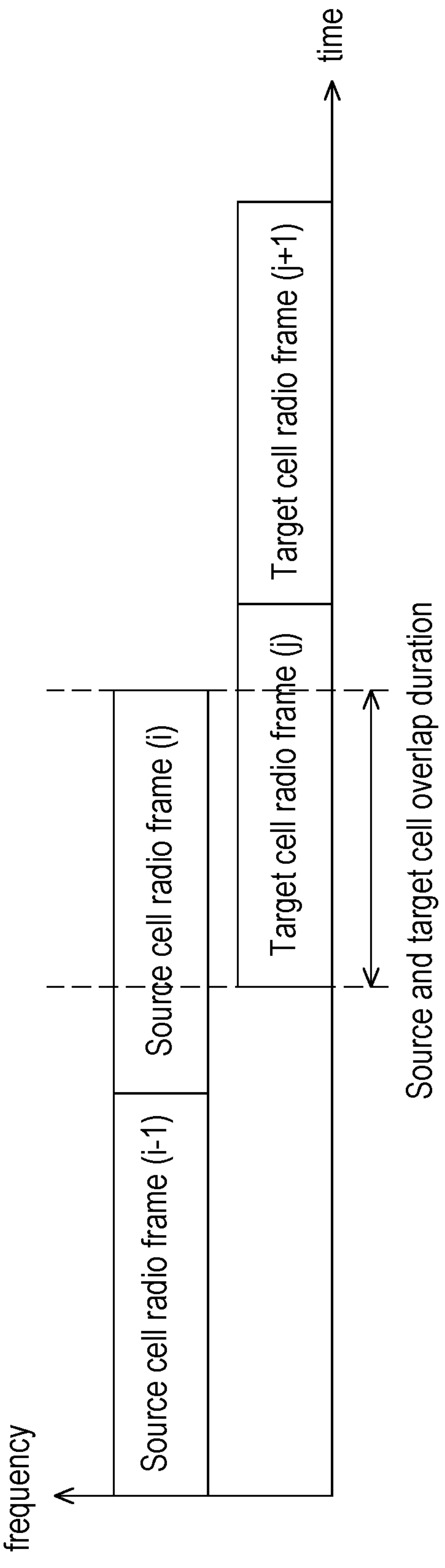
FIG. 5 illustrates a schematic diagram of source and target cell overlap duration according to an embodiment of the present disclosure.
Figure 6:
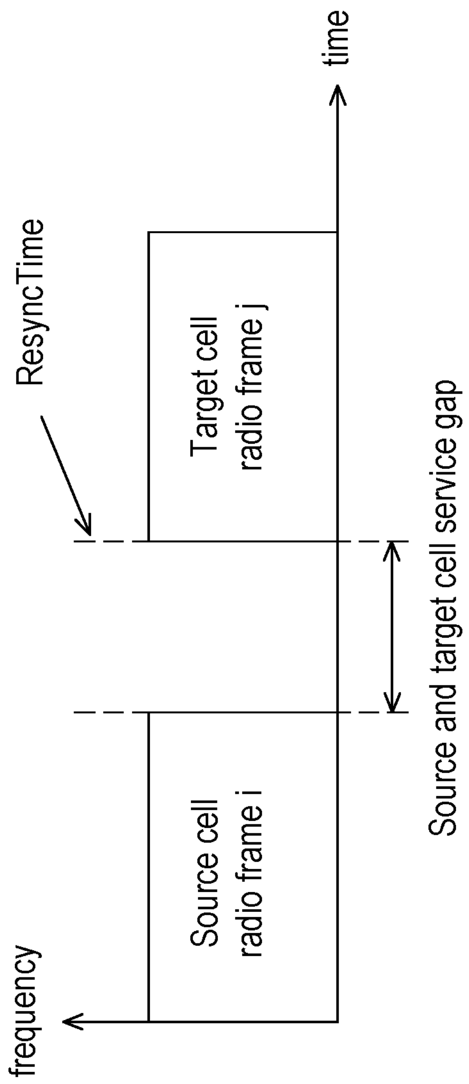
FIG. 6 illustrates a schematic diagram of source and target cell service gap according to an embodiment of the present disclosure.

FIG. 4 illustrates a schematic diagram of broadcasting common parameters of target cell with dispersed handover initiation time according to an embodiment of the present disclosure, wherein the handover procedure may be performed during the overlap duration of the source cell and the target cell as shown in FIG. 5 or during the service gap of the source cell and the target cell as shown in FIG. 6.

Step S401 and step S402 of FIG. 4 may be similar to step S301 and step S302 of FIG. 3 respectively. In step S403, the source cell may transmit a specific target cell configuration (e.g., "Specific Target Cell Config" message) to a UE (e.g., RRC_CONNECTED UE) for providing UE specific handover configuration to the UE.

In one embodiment, the specific target cell configuration may include information such as a RA resource configuration associated with target cell (e.g., dedicated RA parameters RACH-ConfigDedicated), a serving cell configuration (e.g., ServingCellConfig) associated with target cell, a C-RNTI associated with target cell, TA adjustment information (e.g., UE specific TA parameters such as a TA value) associated with target cell, or a handover time $T_{handover}$. The serving cell configuration may be a UE specific serving cell configuration to be applied by a UE after the UE successfully completing the RA procedure with the target cell. The handover time $T_{handover}$ is the time for the UE to perform handover, wherein $T_{handover}$ may be indicated by a system frame number (SFN) and a subframe number.

In step S404, the UE may trigger a handover procedure to connect to the target cell. In one embodiment, the UE may trigger the handover procedure upon the handover time $T_{handover}$. In one embodiment, if both $T_{handover}$ and $T_{RA\_backoff}$ are configured to the UE, the UE may apply $T_{handover}$ to perform the handover procedure.

In step S405, the UE may initiate a RA procedure to inform the target cell of a handover so as to achieve uplink timing synchronization with the target cell. In one embodiment, the UE may transmit the value of TA report (i.e., UE specific TA compensation) to the target cell in the RA procedure. For example, the UE may transmit the value of the TA report according to an indication included in the first target cell configuration message, or the second target cell configuration message.

In one embodiment, the UE may initiate a RA procedure. For example, the UE may initiate a RA procedure after successfully DL synchronized with the target cell.

In one embodiment, the UE may perform an UL timing adjustment (e.g., evaluated by the UE the value of timing advance pre-compensation for uplink transmission by applying TA adjustment information associated with target cell, or by the UE location and the ephemeris of target cell) before performing any UL transmission to the target cell.

In step S406, after the UE completing the handover procedure successfully, the UE may apply the serving cell configuration associated with the target cell.

Figure 7:
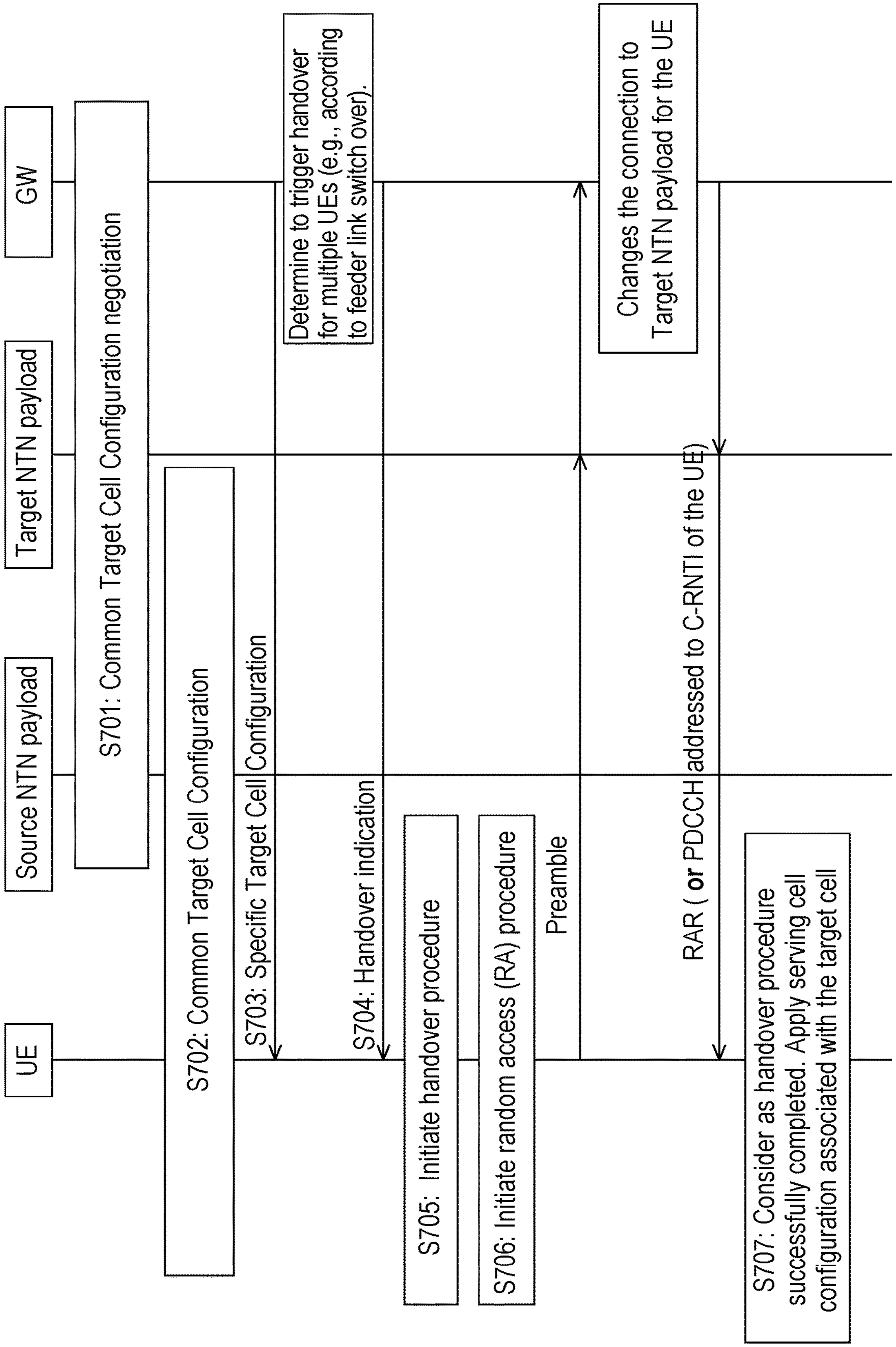
FIG. 7 illustrates a schematic diagram of broadcasting common parameters and handover indication according to an embodiment of the present disclosure.

FIG. 7 illustrates a schematic diagram of broadcasting common parameters and handover indication according to an embodiment of the present disclosure, wherein the handover procedure may be performed during the overlap duration of the source cell and the target cell as shown in FIG. 5.

Step S701, step S702, and step S704 of FIG. 7 may be similar to step S301, step S302, and step S303 of FIG. 3 respectively. After the GW determining to trigger handover for one or more UEs (e.g., according to feeder link switch over), in step S704, the source cell may transmit a handover indication to the one or more UEs by broadcast or unicast. The handover indication may be used for changing the connection(s) of the one or more UEs from the source cell to the target cell. For example, the source cell may use 1 bit in the short message field for the indication of NTN handover, wherein the short message field may be transmitted on PDCCH addressed to P-RNTI. An RRC_IDLE or RRC_INACTIVE UE may omit the handover indication. The handover indication may be transmitted for a System Information (SI) modification period.

In step S705, the UE may initiate a handover procedure according to the reception of the handover indication.

In step S706, the UE may initiate a RA procedure to inform the target cell of a handover so as to achieve uplink timing synchronization with the target cell. In one embodiment, the UE may transmit the value of Timing Advance (TA) report (i.e., UE specific TA compensation value) to the target cell in the RA procedure. For example, the UE may transmit the value of the TA report according to an indication included in a target cell configuration message or included in the system information of the target cell.

In one embodiment, the UE may initiate a RA attempt. In one embodiment, the UE may initiate a RA attempt after successfully DL synchronized with the target cell (e.g., the number of consequent in-sync indicators is larger than a threshold) and perform a RA procedure accordingly. In one embodiment, the UE may initiate a RA attempt and perform a RA procedure upon $T_{handover}$, wherein $T_{handover}$ may be configured to the UE via the specific target cell configuration. In one embodiment, the UE may initiate a RA attempt and perform a RA procedure a configured time (e.g., $T_{RA\_backoff}$) after the RA attempt if the $T_{RA\_backoff}$ is configured (e.g., by the specific target cell configuration), in the nearest upcoming random access occasion (RO), in next discontinuous reception (DRX) ON duration, or in a RO selected after a UE determined RA backoff time. In one embodiment, if both $T_{handover}$ and $T_{RA\_backoff}$ are configured to the UE, the UE may apply $T_{handover}$ to initiate the RA attempt.

In one embodiment, the UE may transmit a preamble when a RA procedure is performed. The preamble may according to the Random Access (RA) resource configured by the Common Target Cell Configuration or the Specific Target Cell Configuration. If a Random Access Response (RAR) or a PDCCH indication addressed to the C-RNTI of the UE associated with the target cell is received after the transmission of the preamble, the RA procedure to the target cell is considered as successfully completed by the UE. If neither RAR nor a PDCCH indication addressed to the C-RNTI of the UE associated with the target cell is received before a pre-configured timer (e.g., a ra-RespondseWindow), the RA procedure to the target cell is considered as failed by the UE.

In step S707, after the UE completing the handover procedure successfully, the UE may apply the serving cell configuration associated with the target cell.

In one embodiment, if both the common target cell configuration and the specific target cell configuration are successfully received by the UE, the UE may initiate the handover procedure to the target cell before the source cell stop serving the area (i.e., the area where the UE is located). The UE may initiate the handover procedure according to the measurement configuration associated with the target cell (e.g., based on L1 or L3 measurement) if the handover indication is not successfully received by the UE and the time to the source cell stop serving the area is less than a threshold.

In one embodiment, if any one of the common target cell configuration and the specific target cell configuration is not successfully received by the UE, the UE may initiate a connection recovery procedure when the time to the source cell stop serving the area is less than a configured threshold.

In one embodiment, the UE (e.g., RRC_CONNECTED UE) may perform an UL timing adjustment (e.g., by applying TA adjustment information associated with target cell, and/or by the UE location and the ephemeris of target cell) before performing any UL transmission to the target cell.

Figure 8:
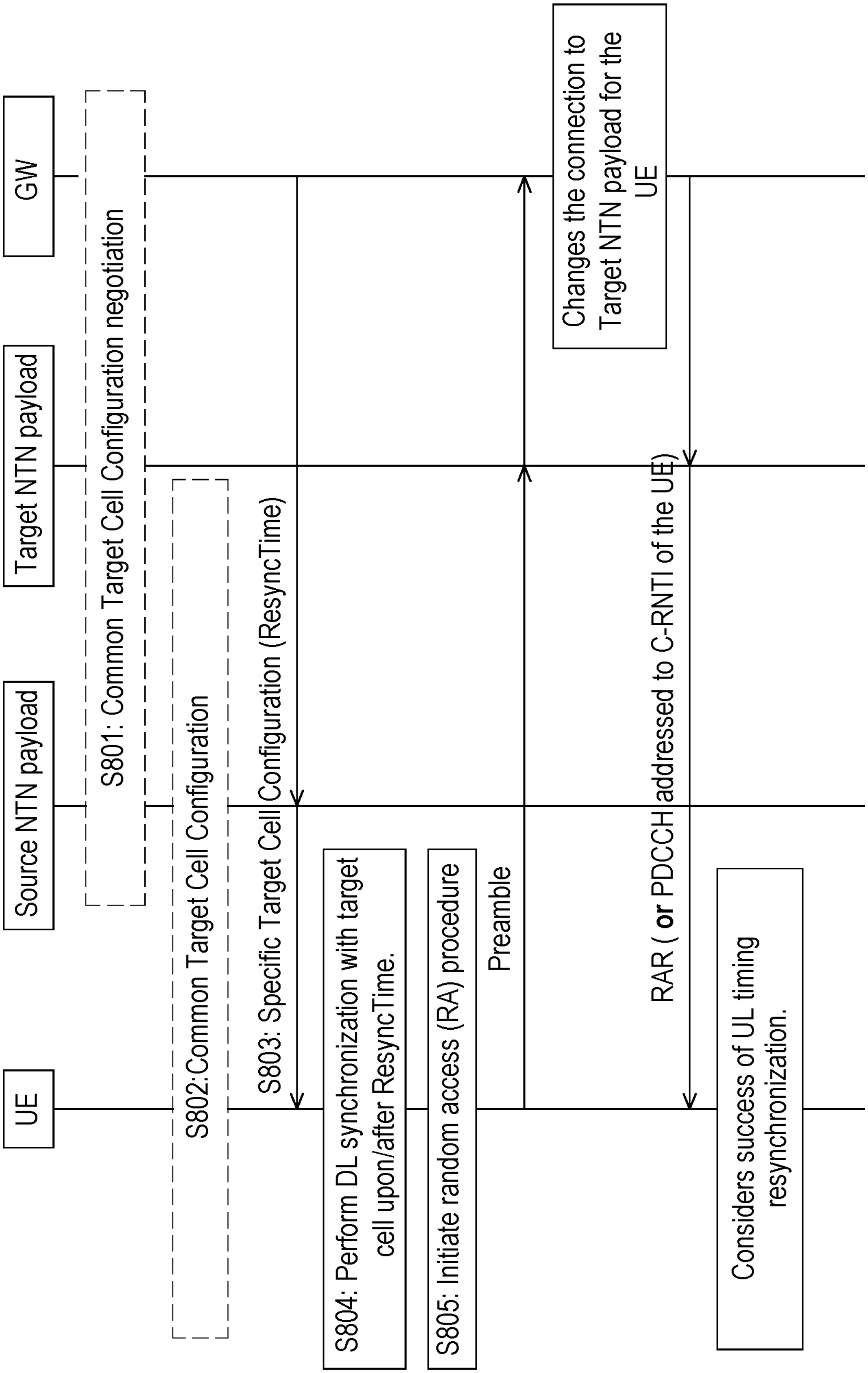
FIG. 8 illustrates a schematic diagram of a handover by re-synchronization according to an embodiment of the present disclosure.

FIG. 8 illustrates a schematic diagram of a handover by re-synchronization according to an embodiment of the present disclosure, wherein the handover procedure may be performed during the service gap of the source cell and the target cell as shown in FIG. 6.

In step S801, the source cell (e.g., source NTN payload) may perform information exchange with a target cell (e.g., target NTN payload) and/or a GW (e.g., NTN GW or gNB) via an intra-gNB inter-cell procedure or an inter-gNB inter-cell procedure. The source cell may obtain a common target cell configuration associated with the target cell by performing a “Common Target Cell Config negotiation” procedure (e.g., a handover preparation procedure).

In step S802, the source cell may transmit a common target cell configuration including the parameters associated with a target cell that are common to multiple UEs by a broadcast signaling, wherein the broadcast signaling may be transmitted via, for example, a broadcast control channel (BCCH). The common target cell configuration may be used for changing the connection(s) of one or more UEs from the source cell to the target cell.

In one embodiment, the common target cell configuration may include information such as a SSB frequency of target cell, a PCI of target cell, ephemeris information of target cell, common TA adjustment information (e.g., common TA parameters including Kmac, Koffset, or epoch time) associated with target cell, a parameter $Offset_{s\_t}$, system information of target cell, or a measurement configuration associated with target cell. The SSB frequency of target cell may indicate the SSB frequency of CD-SSB associated with target cell. The ephemeris information may be used by the UE to evaluate or adjust the timing advance value to access the target cell. If the ephemeris information is absent in the common target cell configuration and there is no valid ephemeris information associated with the target cell store in the UE, the UE may obtain the ephemeris information from system information of the target cell. If the common TA adjustment information is not provided by the common target cell configuration, the UE may estimate the common TA adjustment information according to the UE location and the ephemeris of the target cell. The parameter $Offset_{s\_t}$ is the timing difference between the source cell and the target cell (e.g., to be applied as an SMTC offset). If $Offset_{s\_t}$ is not provided by the common target cell configuration, the UE may search the SSB of target cell blindly (i.e., without network provided assistance information). The system information of target cell may include at least one of SIB1 through SIB5or SIB19. The measurement configuration associated with target cell may include cell level and/or beam level measurement configuration (e.g., measurement objects).

In one embodiment, the common target cell configuration may include a common re-synchronization time (Common ResyncTime), wherein the common re-synchronization time may indicate the starting time that the UE could perform DL synchronization with the target cell.

In one embodiment, the common re-synchronization time may include information such as a time $T_{t\_start}$ or a time $T_{gap}$. $T_{t\_start}$ may indicate the time the target NTN cell is going to start serving the area (e.g., the field may indicate a time in multiples of 10 ms after 00:00:00 on Gregorian calendar date 1 Jan., 1900 (midnight between Sunday, Dec. 31, 1899 and Monday, Jan. 1, 1900)). $T_{gap}$ may indicate the gap time (e.g., in number of ms or slot time) between the source cell stops serving the area and the target cell starts serving the area.

In step S803, the source cell may transmit a specific target cell configuration to the UE (e.g., RRC_CONNECTED UE) for providing UE specific handover configuration to the UE.

In one embodiment, the specific target cell configuration may include information such as a RA resource configuration associated with target cell (e.g., dedicated RA parameters RACH-ConfigDedicated), a serving cell configuration (e.g., ServingCellConfig), a C-RNTI associated with target cell, a cell identifier of the target cell, ephemeris information of the target cell, specific TA adjustment information (e.g., UE specific TA parameters such as a TA value) associated with target cell, or a random backoff time $T_{RA\text{-}backoff}$ of initiating a RA attempt. The serving cell configuration may be a UE specific serving cell configuration to be applied by a UE after the UE successfully completing the RA procedure with the target cell. If the C-RNTI associated with target cell is not provided by the specific target cell configuration, the UE may reuse the C-RNTI provided by the source cell. The UE may perform the handover procedure according to $T_{RA\text{-}backoff}$.

In one embodiment, the specific target cell configuration may include information such as a pre-configured UL transmission (Tx) resource associated with the target cell (i.e., associated with the indicated downlink (DL) reference signal (RS) associated with the target cell such as a SSB frequency), a configuration associated with the target cell (or a configuration of DL RS), a re-synchronization indication, or a specific re-synchronization time (Specific ResyncTime). The pre-configured UL Tx resource may be configured by a PDCCH indication from the target cell. The pre-configured UL Tx resource may be utilized by the UE to perform the first UL transmission to the target cell (e.g., by sending the UL signal through a physical uplink control channel (PUCCH) or a physical uplink shared channel (PUSCH)). Accordingly, the UE may be UL synchronized with the target cell by UL transmission without performing a RA procedure with the target cell. The re-synchronization indication may indicate the UE to handover to the target cell by performing a DL and/or UL re-synchronization procedure. In one embodiment, the specific target cell configuration may be taken by the receiving UE as a re-synchronization indication. The specific re-synchronization time may indicate the time a UE could perform a UL synchronization procedure with the target cell. The specific re-synchronization time may include a time period (e.g., in the form of a timer, in the form of a starting time when the target cell starts serving the area and a validity period of time, a duration (e.g., a starting time and a stopping time) which the UE is allowed to perform a UL synchronization procedure with the target cell by utilizing the pre-configured UL resource or the dedicated RA resource).

In one embodiment, the specific target cell configuration may not include configuration associated with a packet data convergence protocol (PDCP), a radio link control (RLC) protocol, or a media access control (MAC) protocol.

In one embodiment, the specific target cell configuration may be transmitted as a RRC message or as a MAC signaling carrying at least one MAC control element (CE).

In step S804, the UE may perform a DL synchronization procedure with the target cell upon or after the re-synchronization time (e.g., common re-synchronization time or specific re-synchronization time).

In one embodiment, the UE may perform a DL and/or UL re-synchronization procedure with the target cell upon or after the reception of the re-synchronization time (e.g., the reception of the specific target cell configuration message).

In one embodiment, the UE may perform a DL and/or UL re-synchronization procedure with the target cell no earlier than the common re-synchronization time (i.e., upon or after the common re-synchronization time).

In one embodiment, the UE may perform the DL/UL re-synchronization procedure no earlier than $T_{t\_start}$ (i.e., considering the target cell would serve the area no earlier than $T_{t\_start}$). In one embodiment, the UE may not perform the DL/UL re-synchronization procedure with the serving cell (e.g., source cell) between $T_{t\_service}$ and $T_{t\_start}$ (i.e., after $T_{t\_service}$ and before $T_{t\_start}$), wherein $T_{t\_service}$ may be the time the source cell stop serving the area, wherein the information of the area may be provided by the system information of the serving cell (e.g., source cell).

In one embodiment, the UE may perform the DL/UL re-synchronization procedure no earlier than ($T_{t\_service}$+$T_{gap}$). In one embodiment, the UE may not perform the DL/UL re-synchronization procedure with the serving cell (e.g., source cell) between $T_{t\_service}$ and ($T_{t\_service}$+$T_{gap}$).

In one embodiment, the UE may perform the DL re-synchronization procedure based on the primary synchronization signal (PSS) and secondary synchronization signal (SSS). The UE may monitor the SSB according to a configuration of DL RS indicated by the re-synchronization information (e.g., information carried by the common target cell configuration or the specific target cell configuration) so as to be synchronized to the PSS and the SSS in time domain and frequency domain.

In one embodiment, the UE may not perform DL synchronization or measurement of the target cell before the source cell stop serving the area.

In one embodiment, during the time between $T_{t\text{-}service}$ and the common re-synchronization time, the UE may stop the UL/DL transmission or reception with the source cell, stop beam failure detection of the source cell or target cell, or stop radio link failure detection of the source cell or target cell.

In one embodiment, the UE may not perform re-configuring or resetting of PDCP, RLC, or MAC protocols. That is, the UE may apply a Bandwidth Adaptation (BA) command without conveying the configuration of PDCP, RLC, or MAC protocols.

In one embodiment, the UE may apply the information carried by the common target cell configuration and/or specific target cell configuration to perform DL timing synchronization or measurement of the target cell. For example, the UE may apply the $offset_{s\_t}$ to adjust the SMTC.

In step S805, the UE may initiate a RA procedure with the target cell. In one embodiment, the UE may trigger UL timing synchronization by performing the RA procedure with the target cell.

In one embodiment, the UE may apply the common TA parameters and may further adopt the specific TA parameters to perform the UL timing synchronization with the target cell.

In one embodiment, the UE may initiate a preamble transmission of a RA procedure. For example, the UE may perform a preamble transmission of a RA procedure after successfully DL synchronized with the target cell (i.e., the number of consequent in-sync indicators is larger than a threshold).

In one embodiment, the UE may initiate a RA procedure after a configured time (e.g., $T_{RA\_backoff}$) if the UE is configured, in the nearest upcoming RO, in next DRX ON duration, or in a RO selected after a UE determined RA backoff time.

In one embodiment, the UE may perform an UL timing adjustment (e.g., by applying TA adjustment information associated with target cell, or by the UE location and the ephemeris of target cell) before performing any UL transmission to the target cell.

Figure 9:
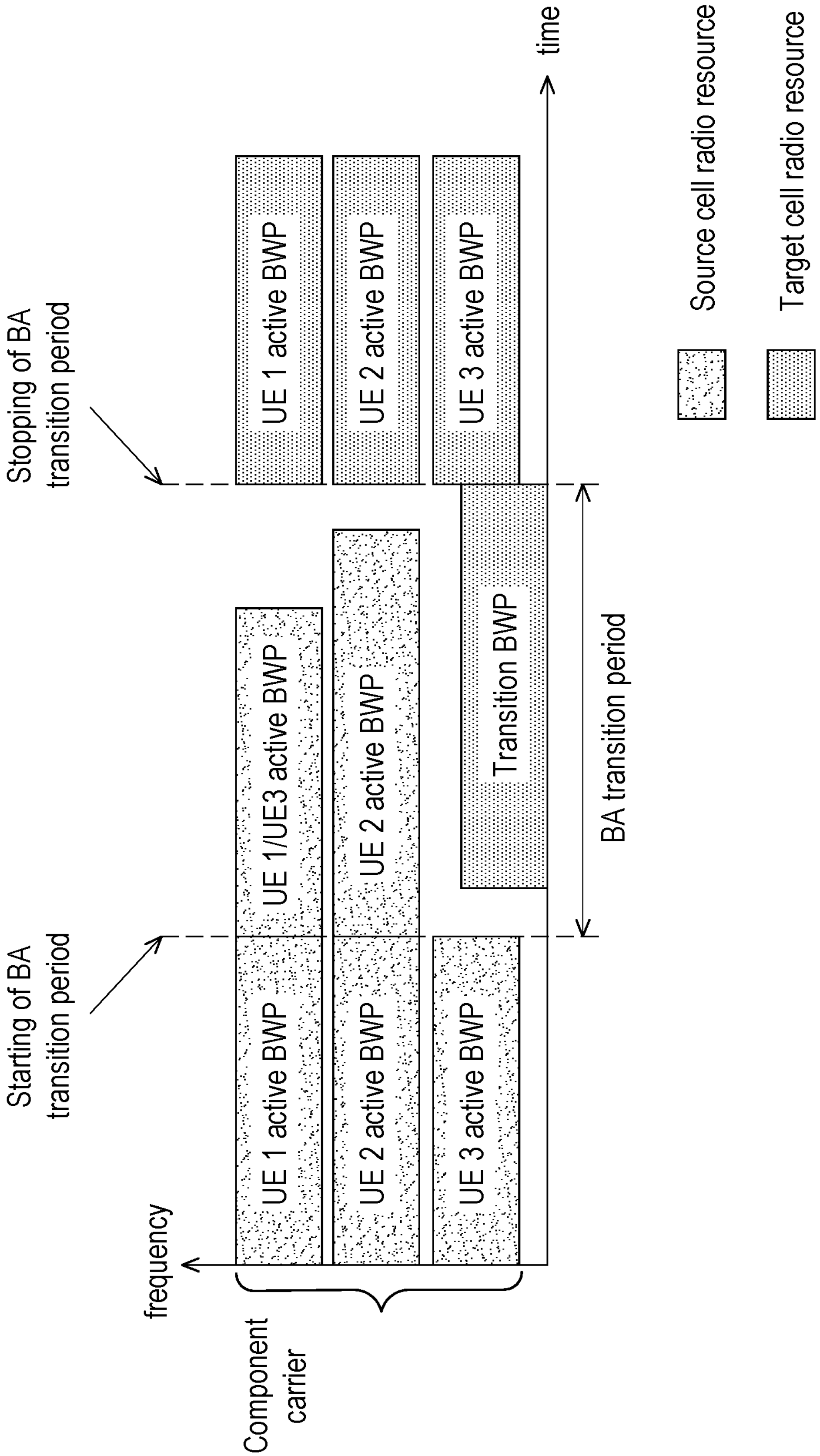
FIG. 9 illustrates a schematic diagram of a bandwidth adaptation (BA) with re-synchronization based handover according to an embodiment of the present disclosure.

A UE may perform a handover procedure based on bandwidth adaptation (BA) with re-synchronization. FIG. 9 illustrates a schematic diagram of a BA with re-synchronization based handover according to an embodiment of the present disclosure. A UE (e.g., UE 3) may transit the active BWP of the UE during a BA transition period (also referred to as a BWP transition period). The transition DL/UL BWP may overlap with the initial DL/UL BWP served by the target cell.

Figure 10:
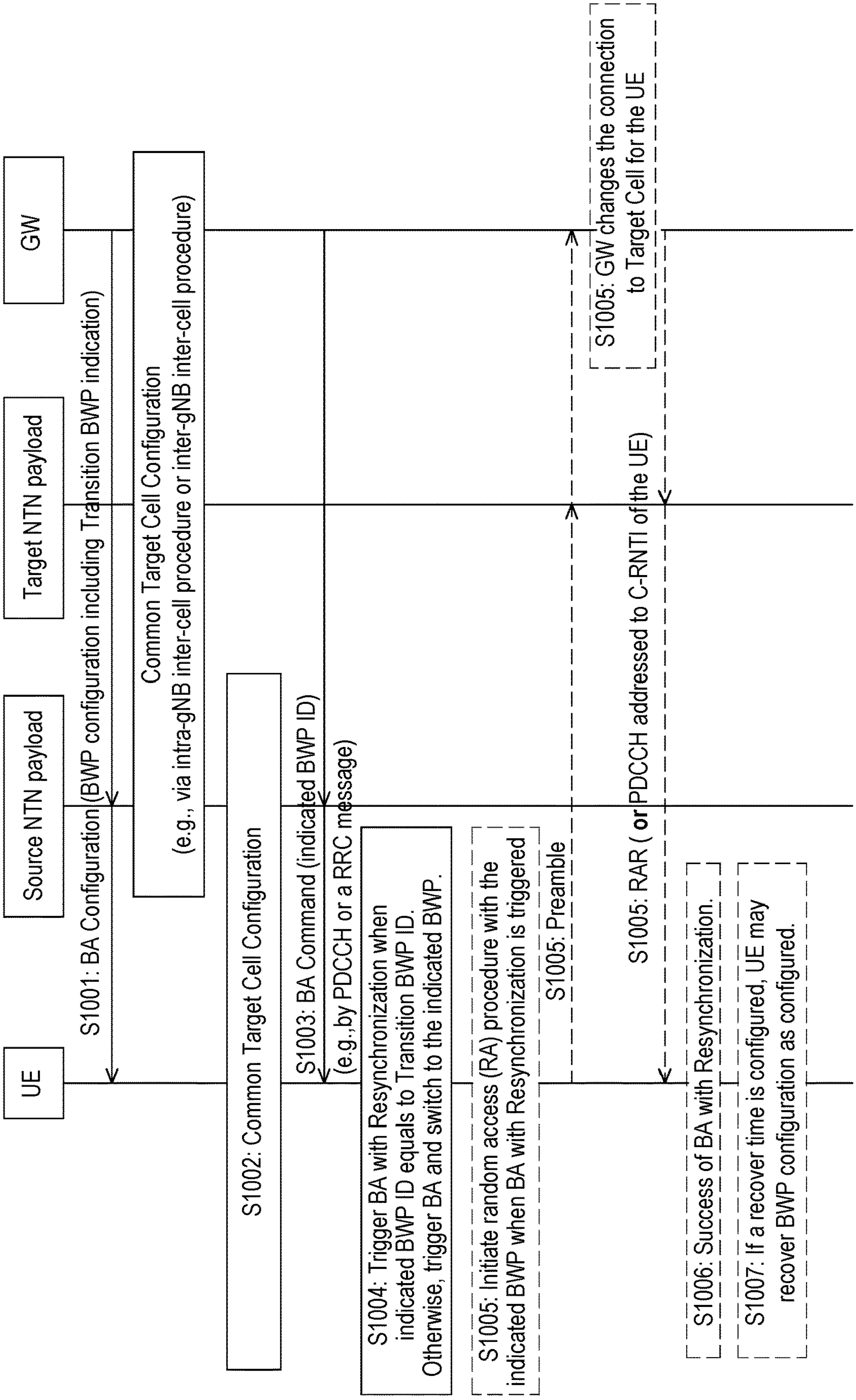
FIG. 10 illustrates a schematic diagram of indicating a transition bandwidth part (BWP) by a BA configuration message according to an embodiment of the present disclosure.

FIG. 10 illustrates a schematic diagram of indicating a transition BWP by a BA configuration message according to an embodiment of the present disclosure. In step S1001, the source cell may provide a BA configuration message (e.g., by RRCReconfiguration message) to the UE by a dedicated signaling (i.e., signaling dedicated to a specific UE). The BA configuration message may include one or more DL or UL BWP configuration (including transition BWP configuration for a BWP, wherein each BWP is configured to use a subset of the total cell bandwidth of the corresponding cell). Each BWP configuration may be associated with a BWP identifier (ID). Each BWP configuration may include a BWP ID, a frequency location and bandwidth of the BWP, or information of subcarrier space to be adopted in the BWP.

In one embodiment, the transition DL BWP configuration may include a BWP ID, a frequency location and bandwidth of the BWP, information of subcarrier space to be used in the BWP, a control resource set (CORESET) and search space for UE to monitor a random access response (RAR), or a CORESET and search space for UE to monitor a downlink reference signal indicating a frequency and time location and subcarrier spacing associated with the downlink reference signal (e.g., SSB frequency or CSI-RS) and PDCCH associated with the transition BWP. The UE may perform the re-synchronization procedure to the target cell according to the downlink reference signal provided by the BA configuration message if configured to the UE.

In one embodiment, the transition UL BWP configuration may include a BWP ID, a frequency location and bandwidth of the BWP, information of subcarrier space to be used in the BWP, resource configuration of a random access channel (RACH) including the resource for UE to transmit a preamble, or a pre-configured UL Tx resource (e.g., a resource configuration of PUCCH or PUSCH transmission).

In one embodiment, the BA configuration message may include an indication indicating one of the multiple DL BWPs as a transition DL BWP or one of the multiple UL BWPs as a transition UL BWP. In one example, the indication may include a parameter of a BA configuration message for indicating the BWP ID to be configured as a transition BWP. The parameter may be a new parameter in an RRC message, wherein the parameter may not impact the legacy BWP configuration. In another example, the indication may include a parameter of a BWP configuration for indicating the BWP is a transition BWP. The parameter may be a new parameter in the BWP configuration.

In one embodiment, the BA configuration message may include information such as an SSB frequency of target cell (or the cell providing the transition BWP), a BWP recovery time $T_{BWP\_recover}$, a timing difference $Offset_{s\_t}$ between the source cell and the target cell, a serving cell configuration (e.g., ServingCellConfig), or a C-RNTI.

In step S1002, the source cell may transmit a common target cell configuration to the UE by broadcast. The common target cell configuration may be transmitted as a SIBi included in an RRC message (e.g., SystemInformation message), or a part of a SIBi included in an RRC message.

In one embodiment, the source cell may transmit an "Obtain Common Target Cell Configuration" indication via a broadcast channel (e.g., BCCH or PCCH) to indicate multiple UEs to obtain the common target cell configuration. The "Obtain Common Target Cell Configuration" indication may be implemented by using 1 bit in the short message field for the indication of the system information modification, wherein the short message field may be transmitted on a PDCCH addressed to a P-RNTI. RRC_IDLE or RRC_INACTIVE UE may not need to obtain the common target cell configuration or may not need to store the parameters included in the common target cell configuration. The "Obtain Common Target Cell Configuration" indication may be implemented by an indication in the system information scheduling information for the indication of a specific SIB is available or is changed. An RRC_IDLE or RRC_INACTIVE UE may omit the indication.

In one embodiment the common target cell configuration may be transmitted for a SI modification period.

In one embodiment, the common target cell configuration may include information such as a SSB frequency of target cell, a PCI of target cell, ephemeris information associated with target cell, common TA adjustment information (e.g., common TA parameters including Kmac, Koffset, or epoch time) associated with target cell, a parameter $Offset_{s\_t}$, or a BWP transition period (or BA transition period). The SSB frequency of target cell may be associated with the DL BWP. The ephemeris information may be used by the UE to evaluate or adjust the timing advance value to perform UL transmission to the target cell. If the ephemeris information is absent in the common target cell configuration and there is no valid ephemeris information associated with the target cell store in the UE, the UE may obtain the ephemeris information from system information of the target cell. If the common TA adjustment information is not provided by the common target cell configuration, the UE may estimate the common TA adjustment information according to the UE location and the ephemeris of the target cell. The parameter $Offset_{s\_t}$ is the timing difference between the source cell and the target cell. If $Offset_{s\_t}$ is not provided by the common target cell configuration, the UE may search the SSB of target cell blindly (i.e., without network provided assistance information). The BWP transition period may be in the form of a starting time and a validity period of time, or in the form of a duration (e.g., a starting time and a stopping time), wherein transition to the BA configuration associated with the target cell is allowed in the duration.

In one embodiment, the common target cell configuration may include a BWP recovery time $T_{BWP\_recover}$, wherein $T_{BWP\_recover}$ may indicate the time (e.g., in the form of SFN and subframe number of the target cell, or an timing offset value) for the UE to recover the BWP configuration (e.g., as UE specific BWP configuration if the UE specific BWP configuration is configured to the UE by BA configuration message, or as the BWP configuration applied by the UE before the reception of "BA command"). The timing offset value mentioned above may be in a number of milliseconds, subframes, or slots. The recovery of BWP configuration may be implemented by applying the BWP configuration as UE specific BWP configuration or as the BWP configuration applied by the UE before the reception of "BA command" message.

In step S1003, the source cell may indicate the UE to perform BA with re-synchronization by a "BA command" message. The "BA command" message may be transmitted by a dedicated signaling to a UE (e.g., by a PDCCH addressed to C-RNTI of the UE, or by an RRC message). The BA command message may not include configuration associated with PDCP, RLC, or MAC protocols.

In one embodiment, the BA command message may include information such as a DL BWP ID associated with the DL BWP to be activated, a UL BWP ID associated with the UL BWP to be activated, a UE specific BWP configuration including a configuration of UE specific UL and/or DL BWPs, a RA resource configuration associated with target cell (e.g., dedicated RA parameters RACH-ConfigDedicated), a serving cell configuration (e.g., ServingCellConfig) associated with the cell providing the transition SSB, a C-RNTI associated with target cell, specific TA adjustment information (e.g., UE specific TA parameters such as a TA value) associated with target cell, or a random backoff time $T_{RA\text{-}backoff}$ of initiating a RA attempt. The serving cell configuration may be a UE specific serving cell configuration to be applied by a UE after the UE successfully completing the RA procedure with the target cell. If the C-RNTI associated with target cell is not provided by the specific target cell configuration, the UE may reuse the C-RNTI provided by the source cell.

In step S1004, the UE may switch to the indicated UL or DL BWP (e.g., BWP indicated by the BA command). The UE would take precedence of (i.e., apply) the value of the parameter configured by the BA command message if both the common target cell configuration and the BA command provide the value of the same parameter (e.g., RA resource configuration, TA adjustment information, or BWP transition period).

In one embodiment, the UE may not perform re-configuring or resetting of PDCP, RLC, or MAC protocols. That is, the UE may apply a BA command without conveying the configuration of PDCP, RLC, or MAC protocols.

In one embodiment, the UE may store the information of the transition BWP (e.g., transition BWP ID). If the indicated BWP is the transition BWP (i.e., the indicated BWP ID is equal to the transition BWP ID), the UE may perform DL timing re-synchronization with the transition DL BWP. That is, the UE may trigger BA with re-synchronization. The DL timing re-synchronization may be performed by monitoring SSB frequency as configured by the common target cell configuration message and synchronized to the SSS and PSS accordingly. The UE may perform a RA procedure in the transition UL BWP and DL BWP, as step S1005 shown in FIG. 10.

In one embodiment, the UE may store the information of the transition BWP (e.g., transition BWP ID). If the indicated BWP is not the transition BWP (i.e., the indicated BWP ID is not equal to the transition BWP ID), the UE may switch to the indicated DL or UL BWP without performing the DL re-synchronization with the indicated DL BWP as well as without performing the RA procedure with the indicated UL BWP. That is, step S1005 as shown in FIG. 10 may be omitted by the UE.

In one embodiment, if both the SSB frequency associated with the transition BWP provided by the BA Configuration message and a configuration of downlink reference signal (e.g., the configuration for all the UEs) provided by the Common Target Cell Configuration message are configured to the UE, the UE may perform the re-synchronization procedure according to the SSB frequency provided by the BA configuration message.

In step S1006, the UE may consider the procedure (e.g., BA with re-synchronization) triggered by the BA command as successfully completed upon receiving the PDCCH addressed to the C-RNTI of the UE.

In step S1007, upon BWP recovery time (i.e., the time indicated by $T_{BWP\_recover}$), if UE specific BWP configuration and $T_{BWP\_recover}$ are configured, the UE may apply BWP configuration (e.g., UE specific BWP configuration) upon $T_{BWP\_recover}$. If UE specific BWP configuration is not configured and $T_{BWP\_recover}$ is configured, the UE may switch to the BWP upon $T_{BWP\_recover}$, wherein the BWP is the active BWP before the UE switching to the transition BWP. In other words, the UE may apply a BWP configuration before performing the re-synchronization procedure and may resume the BWP configuration (e.g., according to $T_{BWP\_recover}$) after completing the re-synchronization procedure or after receiving a PDCCH addressed to a C-RNTI, wherein the C-RNTI is associated with the cell corresponding to the transition SSB. For example, if the UE was operated in "BWP_3" before being switched to the transition BWP by the BA command. The UE may switch to "BWP_3" upon or after $T_{BWP\_recover}$. If $T_{BWP\_recover}$ is configured as a timing offset value, the value of BWP recovery time may be calculated by ($T_{t\text{-}service}$+$T_{BWP\_recover}$), i.e., the time which is calculated by the time indicated by $T_{BWP\_recover}$ after the time the serving cell stop serving the area.

In one embodiment, the UE may perform an UL timing adjustment (e.g., by applying TA adjustment information associated with target cell, or by the UE location and the ephemeris of target cell) before performing any UL transmission to the target cell.

Figure 11:
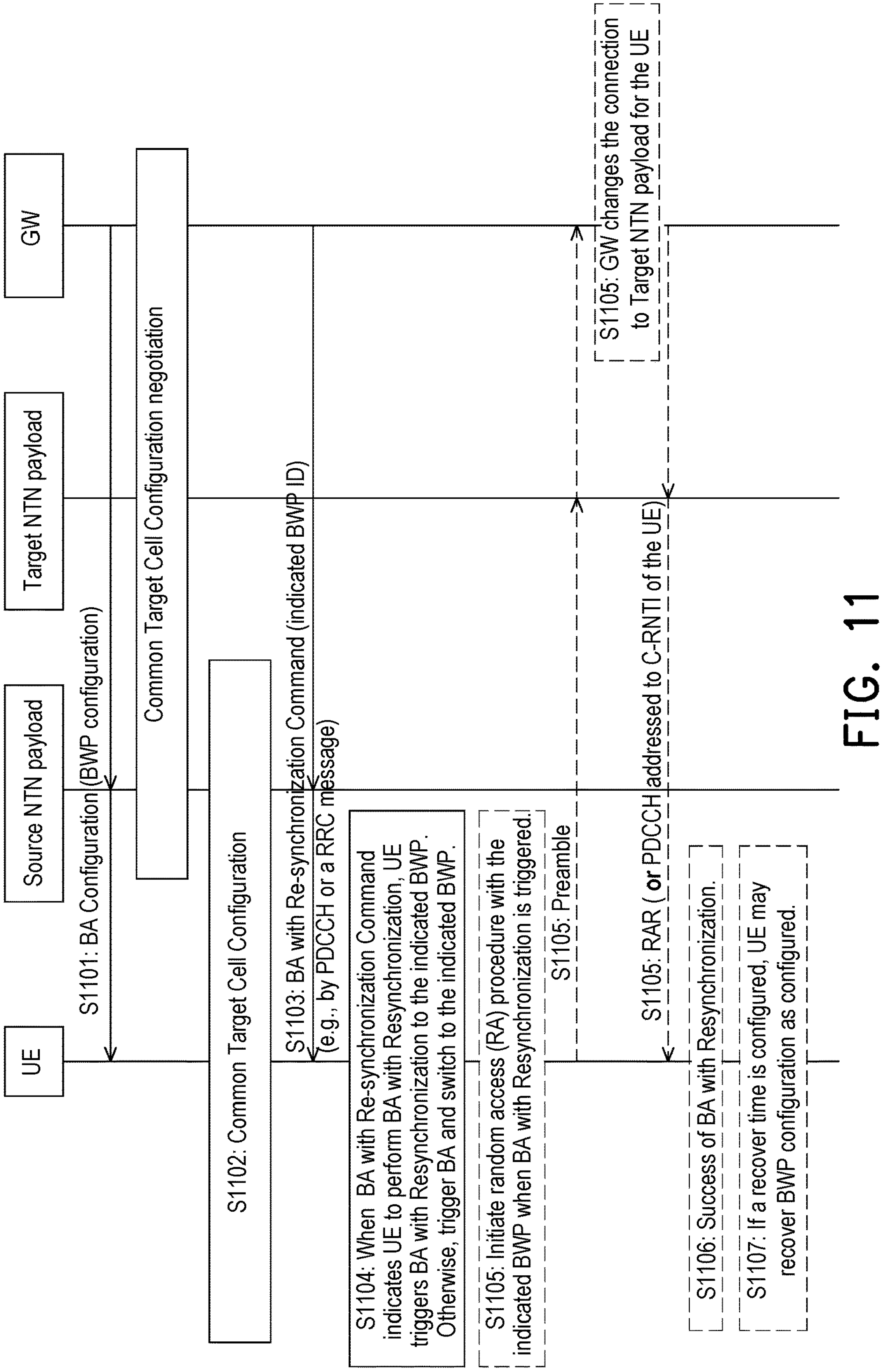
FIG. 11 illustrates a schematic diagram of indicating a BWP switching with re-synchronization by a BA with re-synchronization command according to an embodiment of the present disclosure.

FIG. 11 illustrates a schematic diagram of indicating a BWP switching with re-synchronization by a BA with re-synchronization command according to an embodiment of the present disclosure. In step S1101, the source cell may provide a BA configuration message (e.g., by RRCReconfiguration message) to the UE by a dedicated signaling (i.e., signaling dedicated to a specific UE). The BA configuration message may include one or more DL or UL BWP configuration (i.e., transition BWP configuration). Each BWP configuration may be associated with a BWP ID. Each BWP configuration may include a BWP ID, a frequency location and bandwidth of the BWP, or information of subcarrier space to be adopted in the BWP.

In one embodiment, the transition DL BWP configuration may include a BWP ID, a frequency location and bandwidth of the BWP, information of subcarrier space to be used in the BWP, a CORESET and search space for UE to monitor a RAR, or a CORESET and search space for UE to monitor a downlink reference signal (e.g., SSB frequency or CSI-RS) and a PDCCH associated with the transition BWP. The UE may perform the re-synchronization procedure to the target cell according to the downlink reference signal configured by the BA configuration message if both the SSB frequency configured by a Common Target Cell Configuration and the downlink reference signal configured by a BA configuration message are both configured to the UE.

In one embodiment, the transition UL BWP configuration may include a BWP ID, a frequency location and bandwidth of the BWP, information of subcarrier space to be used in the BWP, resource configuration of a RACH including the resource for UE to transmit a preamble, or a pre-configured UL Tx resource (e.g., a resource configuration of PUCCH or PUSCH transmission).

In step S1102, the source cell may transmit a common target cell configuration to the UE by broadcast. The common target cell configuration may be transmitted as a SIBi included in an RRC message (e.g., SystemInformation message), or a part of a SIBi included in an RRC message.

In one embodiment, the source cell may transmit an "Obtain Common Target Cell Configuration" indication via a broadcast channel (e.g., PCCH) to indicate multiple UEs to obtain the common target cell configuration. The "Obtain Common Target Cell Configuration" indication may be implemented by using 1 bit in the short message field for the indication of the system information modification, wherein the short message field may be transmitted on a PDCCH addressed to a P-RNTI. RRC_IDLE or RRC_INACTIVE UE may not need to obtain the common target cell configuration or may not need to store the parameters included in the common target cell configuration. The "Obtain Common Target Cell Configuration" indication may be implemented by using 1 bit in the short message field for the indication of a specific SIB change, wherein the short message field may be transmitted on a PDCCH addressed to a P-RNTI. In one embodiment, the "Obtain Common Target Cell Configuration" indication may be implemented by an indication in the system information scheduling information for indicating a specific SIB is available or is changed. An RRC_IDLE or RRC_INACTIVE UE may omit the indication.

In one embodiment the common target cell configuration may be transmitted for a SI modification period.

In one embodiment, the common target cell configuration may include information such as a SSB frequency of target cell, a PCI of target cell, ephemeris information of target cell, common TA adjustment information (e.g., common TA parameters including Kmac, Koffset, or epoch time) associated with target cell, or a parameter $\text{Offset}_{s\_t}$, or a BWP transition period (or BA transition period). The SSB frequency of target cell may indicate the SSB frequency of CD-SSB associated with target cell, and the SSB frequency may be associated with the DL BWP. The ephemeris information may be used by the UE to evaluate or adjust the timing advance value to access the target cell. If the ephemeris information is absent in the common target cell configuration and there is no valid ephemeris information associated with the target cell store in the UE, the UE may obtain the ephemeris information from system information of the target cell. If the common TA adjustment information is not provided by the common target cell configuration, the UE may estimate the common TA adjustment information according to the UE location and the ephemeris of the target cell. The parameter $\text{Offset}_{s\_t}$ is the timing difference between the source cell and the target cell. If $\text{Offset}_{s\_t}$ is not provided by the common target cell configuration, the UE may search the SSB of target cell blindly (i.e., without network provided assistance information). The BWP transition period may be in the form of a starting time and a validity period of time, or in the form of a duration (e.g., a starting time and a stopping time), wherein transition to the BA configuration associated with the target cell is allowed in the duration.

In one embodiment, the common target cell configuration may include a BWP recovery time $T_{BWP\_recover}$, wherein $T_{BWP\_recover}$ may indicate the time (e.g., in the form of SFN and subframe number of the target cell, or an timing offset value) for the UE to recover the BWP configuration (e.g., as UE specific BWP configuration if the UE specific BWP configuration is configured to the UE, or as the BWP configuration applied by the UE before the reception of "BA command"). The timing offset value mentioned above may be in a number of milliseconds, subframes, or slots. The recovery of BWP configuration may be implemented by applying the BWP configuration as UE specific BWP configuration or as the BWP configuration applied before the reception of "BA command".

In step S1103, the source cell may indicate the UE to perform BA with re-synchronization by a "BA with re-synchronization command" message. The "BA with re-synchronization command" message may be transmitted by a dedicated signaling to a UE (e.g., by a PDCCH addressed to C-RNTI of the UE, or by an RRC message). The BA with re-synchronization command message may not include configuration associated with PDCP, RLC, or MAC protocols.

In one embodiment, the BA with re-synchronization command message may include information such as a DL BWP ID associated with the DL BWP to be activated, a UL BWP ID associated with the UL BWP to be activated, a UE specific BWP configuration including a configuration of UE specific UL and/or DL BWPs, a RA resource configuration associated with target cell (e.g., dedicated RA parameters RACH-ConfigDedicated), a serving cell configuration (e.g., ServingCellConfig) associated with the cell providing the transition SSB, a C-RNTI associated with target cell, specific TA adjustment information (e.g., UE specific TA parameters such as a TA value) associated with target cell, or a random backoff time $T_{RA\text{-}backoff}$ of initiating a timing offset of performing preamble transmission. The serving cell configuration may be a UE specific serving cell configuration to be applied by a UE after the UE successfully completing the RA procedure with the target cell. If the C-RNTI associated with target cell is not provided by the specific target cell configuration, the UE may reuse the C-RNTI provided by the source cell.

In one embodiment, the BA with re-synchronization command message may include a transition DL BWP configuration, wherein the transition DL BWP configuration may include a BWP ID, a frequency location and bandwidth of the BWP, information of subcarrier space to be used in the BWP, a CORESET and search space for UE to monitor a RAR or a CORESET and search space for UE to monitor a downlink reference signal (e.g., SSB frequency or CSI-RS) and a PDCCH associated with the transition BWP. The UE may perform the re-synchronization procedure to the target cell according to the downlink reference signal configuration provided by the BA with re-synchronization Command message if both the SSB frequency provided by the Common Target Cell Configuration message and the downlink reference signal provided by the BA with re-synchronization Command message are configured to the UE.

In one embodiment, the BA with re-synchronization command message may include a transition UL BWP configuration, wherein, the transition UL BWP configuration may include a BWP ID, a frequency location and bandwidth of the BWP, information of subcarrier space to be used in the BWP, resource configuration of a RACH including the resource for UE to transmit a preamble, or a pre-configured UL Tx resource (e.g., a resource configuration of PUCCH or PUSCH transmission).

In step S1104, the UE may switch to the indicated UL or DL BWP (e.g., BWP indicated by the BA with re-synchronization command). The UE would take precedence of (i.e., apply) the value of the parameter configured by the BA with re-synchronization command message if both the common target cell configuration and the BA with re-synchronization command provide the value of the same parameter (e.g., RA resource configuration, TA adjustment information, or BWP transition period).

In one embodiment, the UE may not perform re-configuring or resetting of PDCP, RLC, or MAC protocols. That is, the UE may apply a BA with re-synchronization command without conveying the configuration of PDCP, RLC, or MAC protocols.

In one embodiment, the UE may perform DL timing re-synchronization with the indicated DL BWP. That is, the UE may trigger BA with re-synchronization to the indicated BWP. The DL timing re-synchronization may be performed by monitoring SSB frequency as configured by the common target cell configuration message and synchronized to the SSS and PSS accordingly. The UE may perform a RA procedure in the transition UL BWP by utilizing the RACH resources associated with the transition UL BWP and DL BWP, as step S1105 shown in FIG. 11.

In one embodiment, if both the downlink reference signal associated with the transition BWP and a configuration of SSB frequency provided by the Common Target Cell Configuration message are configured to the UE, the UE may perform the re-synchronization procedure according to the downlink reference signal associated with the transition BWP.

In step S1106, the UE may consider the procedure (e.g., BA with re-synchronization) triggered by the BA with re-synchronization command as successfully completed upon receiving the PDCCH addressed to the C-RNTI of the UE.

In step S1107, upon or after BWP recovery time (i.e., the time indicated by $T_{BWP\_recover}$), if UE specific BWP configuration and $T_{BWP\_recover}$ are configured, the UE may apply the UE specific BWP configuration upon or after $T_{BWP\_recover}$. If UE specific BWP configuration is not configured and $T_{BWP\_recover}$ is configured, the UE may recover the BWP configuration, as that was applied by the UE before receiving the "BA with re-synchronization command" message. If $T_{BWP\_recover}$ is configured as a timing offset value, the value of BWP recovery time may be calculated by ($T_{t\text{-}service}+T_{BWP\_recever}$), i.e., the time which is calculated by the time indicated by $T_{BWP\_recover}$ after the time the serving cells stop serving the area.

In one embodiment, the UE may perform an UL timing adjustment (e.g., by applying TA adjustment information associated with target cell, or by the UE location and the ephemeris of target cell) before performing any UL transmission to the target cell.

Figure 12:
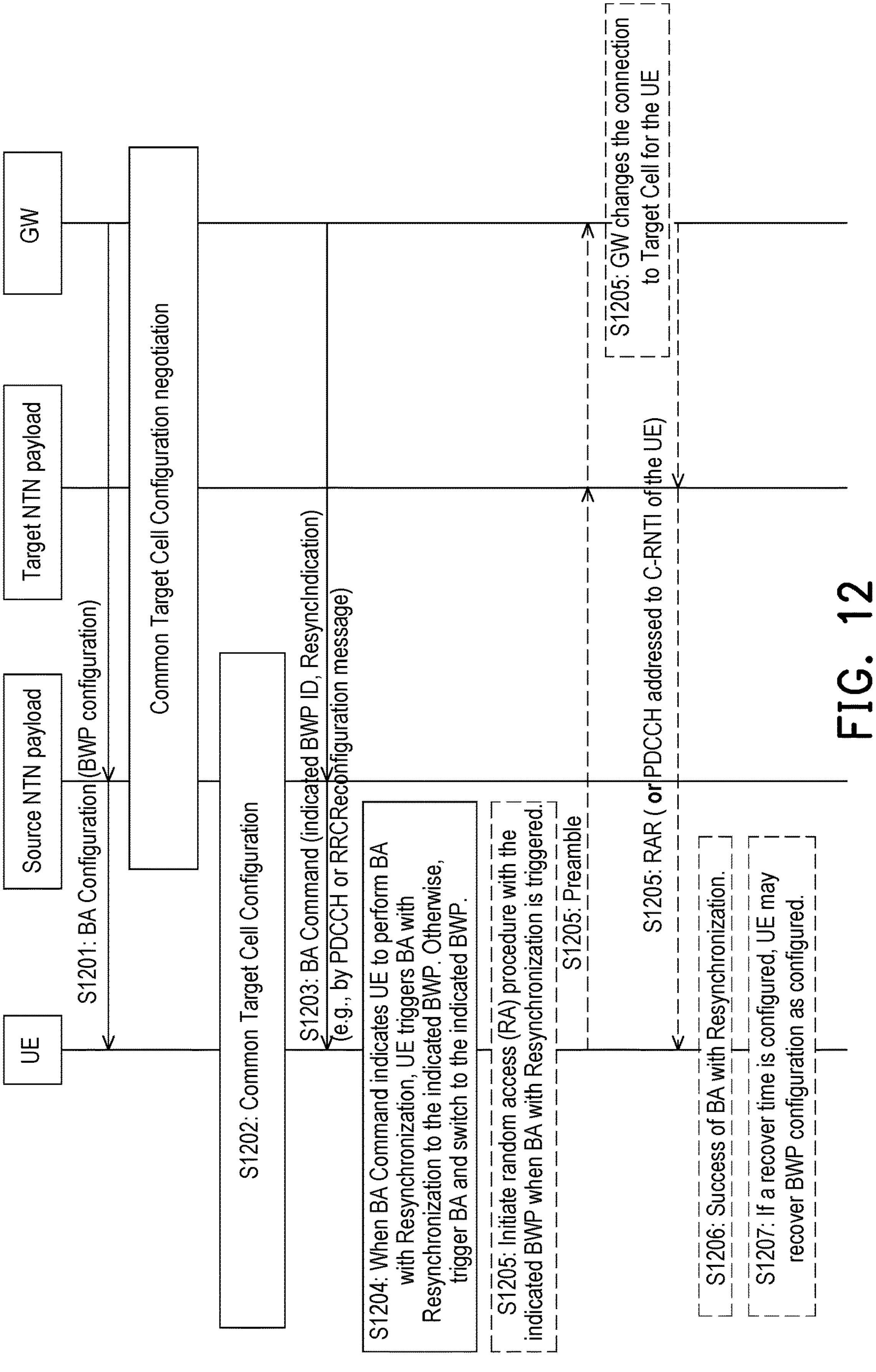
FIG. 12 illustrates a schematic diagram of indicating a BWP switching with re-synchronization by a parameter according to an embodiment of the present disclosure.

FIG. 12 illustrates a schematic diagram of indicating a BWP switching with re-synchronization by a parameter according to an embodiment of the present disclosure. In step S1201, the source cell may provide a BA configuration message (e.g., by RRCReconfiguration message) to the UE by a dedicated signaling (i.e., signaling dedicated to a specific UE). The BA configuration message may include one or more DL or UL BWP configuration (i.e., transition BWP configuration). Each BWP configuration may be associated with a BWP ID. Each BWP configuration may include a BWP ID, a frequency location and bandwidth of the BWP, or information of subcarrier space to be adopted in the BWP.

In one embodiment, the transition DL BWP configuration may include a BWP ID, a frequency location and bandwidth of the BWP, information of subcarrier space to be used in the BWP, a CORESET and search space for UE to monitor a RAR, or a CORESET and search space for UE to monitor a downlink reference signal (e.g., SSB frequency or CSI-RS) and a PDCCH associated with the transition BWP. The UE may perform the re-synchronization procedure to the target cell according to the downlink reference signal configured by the BA configuration message if both the SSB frequency provided by the Common Target Cell Configuration and the downlink reference signal provided by the BA configuration message are configured to the UE.

In one embodiment, the transition UL BWP configuration may include a BWP ID, a frequency location and bandwidth of the BWP, information of subcarrier space to be used in the BWP, resource configuration of a RACH including the resource for UE to transmit a preamble, or a pre-configured UL Tx resource (e.g., a resource configuration of PUCCH or PUSCH transmission).

In step S1202, the source cell may transmit a common target cell configuration to the UE by broadcast. The common target cell configuration may be transmitted as a SIBi included in an RRC message (e.g., SystemInformation message), or a part of a SIBi included in an RRC message.

In one embodiment, the source cell may transmit an "Obtain Common Target Cell Configuration" indication via a broadcast channel (e.g., PCCH) to indicate multiple UEs to obtain the common target cell configuration. The "Obtain Common Target Cell Configuration" indication may be implemented by using 1 bit in the short message field for the indication of the system information modification, wherein the short message field may be transmitted on a PDCCH addressed to a P-RNTI. RRC_IDLE or RRC_INACTIVE UE may not need to obtain the common target cell configuration or may not need to store the parameters included in the common target cell configuration. In one embodiment, the "Obtain Common Target Cell Configuration" indication may be implemented by an indication in the system information scheduling information for indicating a specific SIB is available or is changed. An RRC_IDLE or RRC_INACTIVE UE may omit the indication.

In one embodiment the common target cell configuration may be transmitted for a SI modification period.

In one embodiment, the common target cell configuration may include information such as a SSB frequency of target cell, a PCI of target cell, ephemeris information of target cell, common TA adjustment information (e.g., common TA parameters including Kmac, Koffset, or epoch time) associated with target cell, or a parameter $Offset_{s\_t}$, or a BWP transition period (or BA transition period). The SSB frequency of target cell may indicate the SSB frequency associated with target cell, and the SSB frequency may be associated with the DL BWP. The ephemeris information may be used by the UE to evaluate or adjust the timing advance value to access the target cell. If the ephemeris information is absent in the common target cell configuration and there is no valid ephemeris information associated with the target cell store in the UE, the UE may obtain the ephemeris information from system information of the target cell. If the common TA adjustment information is not provided by the common target cell configuration, the UE may estimate the common TA adjustment information according to the UE location and the ephemeris of the target cell. The parameter $Offset_{s\_t}$ is the timing difference between the source cell and the target cell. If $Offset_{s\_t}$ is not provided by the common target cell configuration, the UE may search the SSB of target cell blindly (i.e., without network provided assistance information). The BWP transition period may be in the form of a starting time and a validity period of time, or in the form of a duration (e.g., a starting time and a stopping time), wherein transition to the BA configuration associated with the target cell is allowed in the duration.

In one embodiment, the common target cell configuration may include a BWP recovery time $T_{BWP\_recover}$, wherein $T_{BWP\_recover}$ may indicate the time (e.g., in the form of SFN and subframe number of the target cell, or an timing offset value) for the UE to recover the BWP configuration (e.g., as UE specific BWP configuration if the UE specific BWP configuration is configured to the UE, or as the BWP configuration applied by the UE before the reception of "BA command"). The timing offset value mentioned above may be in a number of milliseconds, subframes, or slots. The recovery of BWP configuration may be implemented by applying the BWP configuration as UE specific BWP configuration or as the BWP configuration applied by the UE before the reception of "BA command".

In step S1203, the source cell may indicate the UE to perform BA with re-synchronization by a "BA command" message with a re-synchronization indication (e.g., Resync-Indication) parameter. The "BA command" message may be transmitted by a dedicated signaling to a UE (e.g., by a PDCCH addressed to C-RNTI of the UE, or by an RRC message). The BA command message may not include configuration associated with PDCP, RLC, or MAC protocols.

In one embodiment, the BA command message may include information such as a DL BWP ID associated with the DL BWP to be activated, a UL BWP ID associated with the UL BWP to be activated, a UE specific BWP configuration including a configuration of UE specific UL and/or DL BWPs, a RA resource configuration associated with target cell (e.g., dedicated RA parameters RACH-ConfigDedicated), a serving cell configuration (e.g., ServingCellConfig) associated with the cell providing the transition SSB, a C-RNTI associated with target cell, or a random backoff time $T_{RA\text{-}backoff}$ of initiating a RA attempt. The serving cell configuration may be a UE specific serving cell configuration to be applied by a UE after the UE successfully completing the RA procedure with the target cell. If the C-RNTI associated with target cell is not provided by the specific target cell configuration, the UE may reuse the C-RNTI provided by the source cell.

In one embodiment, the BA command message may include a re-synchronization indication. when the re-synchronization indication is set (e.g., if the re-synchronization indication is presented in the BA command or the value of the re-synchronization indication is set to a specific value (e.g., the value to set to "true")), the UE may perform BA with re-synchronization accordingly.

In step S1204, the UE may switch to the indicated UL or DL BWP (e.g., BWP indicated by the BA command) upon the reception of the BA command. The UE would take precedence of (i.e., apply) the value of the parameter configured by the BA command message if both the common target cell configuration and the BA command provide the value of the same parameter (e.g., RA resource configuration, TA adjustment information, or BWP transition period).

In one embodiment, the UE may not perform re-configuring or resetting of PDCP, RLC, or MAC protocols. That is, the UE may apply a BA command without conveying the configuration of PDCP, RLC, or MAC protocols.

In one embodiment, if the re-synchronization indication is set, the UE may perform DL timing re-synchronization with the indicated DL BWP. That is, the UE may trigger BA with re-synchronization to the indicated BWP. The DL timing re-synchronization may be performed by monitoring SSB frequency as configured by the common target cell configuration message and synchronized to the SSS and PSS accordingly. The UE may perform a RA procedure in the transition UL BWP by utilizing the RACH resource associated with the transition UL and DL BWP, as step S1205 shown in FIG. 12. If the re-synchronization indication is not set, the UE may switch to the indicated DL or UL BWP without performing the DL-synchronization with the indicated DL BWP as well as without performing the RA procedure with the indicated UL BWP. That is, step S1205 as shown in FIG. 12 may be omitted by the UE.

In one embodiment, if both the downlink reference signal associated with the transition BWP provided by the BA configuration message and a configuration of SSB provided by the Common Target Cell configuration message are configured to the UE, the UE may perform the re-synchronization procedure according to the downlink reference signal associated with the transition BWP.

In step S1206, the UE may consider the procedure (e.g., BA with re-synchronization) triggered by the BA command as successfully completed upon receiving the PDCCH addressed to the C-RNTI of the UE.

In step S1207, upon or after BWP recovery time (i.e., the time indicated by $T_{BWP\_recover}$), if UE specific BWP configuration and $T_{BWP\_recover}$ are configured, the UE may apply BWP configuration (e.g., UE specific BWP configuration) upon or after $T_{BWP\_recover}$. If UE specific BWP configuration is not configured and $T_{BWP\_recover}$ is configured, the UE may recover the BWP configuration, wherein the BWP configuration is the configuration applied by the UE before receiving the "BA command" message. If $T_{BWP\_recover}$ is configured as a timing offset value, the value of BWP recovery time may be calculated by ($T_{t\text{-}service}$+$T_{BWP\_recever}$), i.e., the time which is calculated by the time indicated by $T_{BWP\_recover}$ after the time the serving cells stop serving the area.

In one embodiment, the UE may perform an UL timing adjustment (e.g., by applying TA adjustment information associated with target cell, or by the UE location and the ephemeris of target cell) before performing any UL transmission to the target cell.

Figure 13:
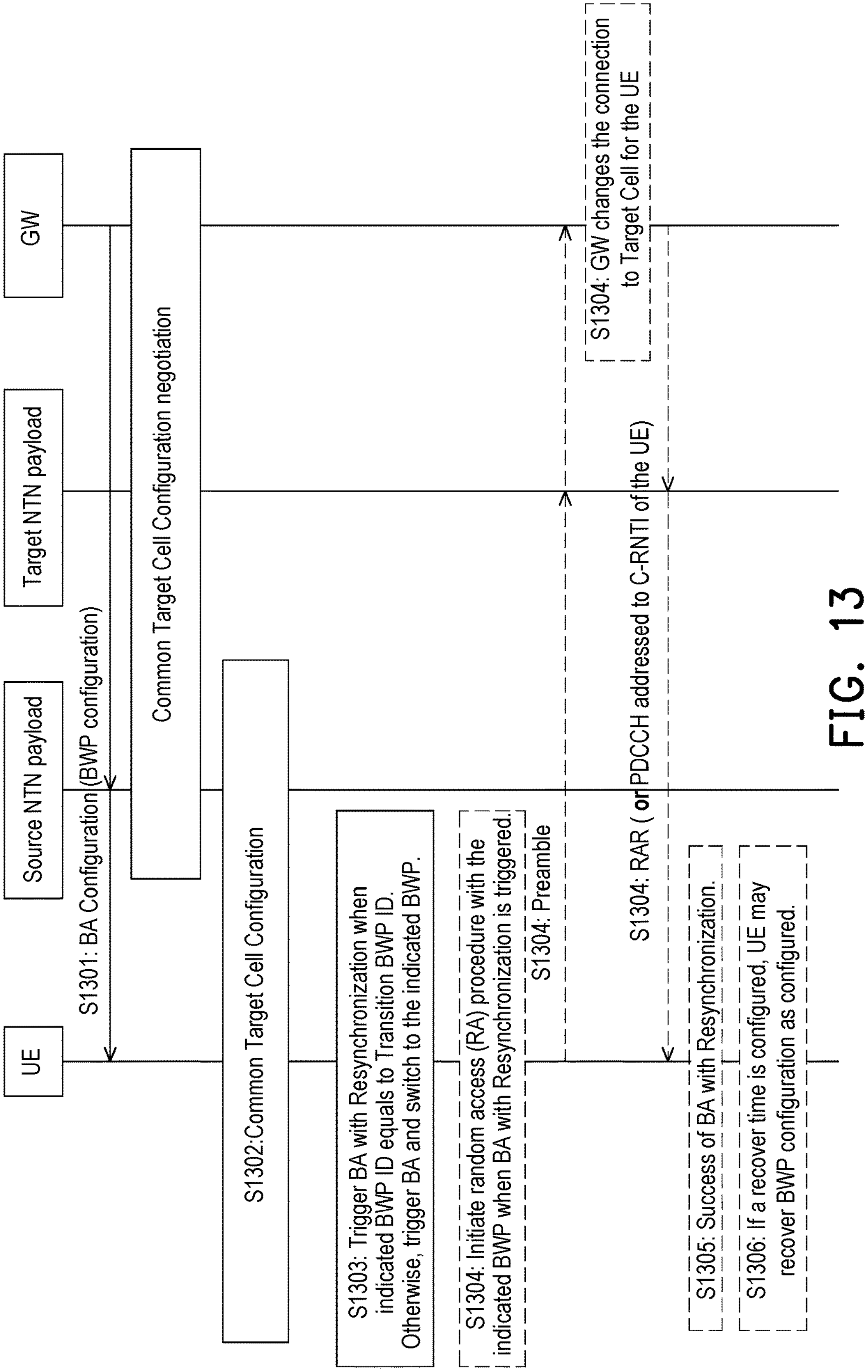
FIG. 13 illustrates a schematic diagram of triggering BA with re-synchronization by the reception of common target cell configuration according to an embodiment of the present disclosure.

FIG. 13 illustrates a schematic diagram of triggering BA with re-synchronization by the reception of common target cell configuration according to an embodiment of the present disclosure.

In step S1301, the source cell may provide a BA configuration message (e.g., by RRCReconfiguration message) to the UE by a dedicated signaling (i.e., signaling dedicated to a specific UE). The BA configuration message may include one or more DL or UL BWP configuration (i.e., transition BWP configuration). Each BWP configuration may be associated with a BWP ID. Each BWP configuration may include a BWP ID, a frequency location and bandwidth of the BWP, or information of subcarrier space to be adopted in the BWP.

In one embodiment, the transition DL BWP configuration may include a BWP ID, a frequency location and bandwidth of the BWP, information of subcarrier space to be used in the BWP, a CORESET and search space for UE to monitor a RAR, or a CORESET and search space for UE to monitor a downlink reference signal (e.g., SSB frequency or CSI-RS) and a PDCCH associated with the transition BWP. The UE may perform the re-synchronization procedure to the target cell according to the downlink reference signal configuration provided by the BA configuration message if both the SSB frequency provided by the Common Target Cell Configuration message and the downlink reference signal provided by the BA configuration message are configured to the UE.

In one embodiment, the transition UL BWP configuration may include a BWP ID, a frequency location and bandwidth of the BWP, information of subcarrier space to be used in the BWP, resource configuration of a RACH including the resource for UE to transmit a preamble, or a pre-configured UL Tx resource (e.g., a resource configuration of PUCCH or PUSCH transmission).

In one embodiment, the BA configuration message may include specific TA adjustment information (e.g., UE specific TA parameters such as a TA value) associated with target cell or a random backoff time $T_{RA\text{-}backoff}$ of initiating a RA attempt.

In step S1302, the source cell may transmit a common target cell configuration to the UE by broadcast. The common target cell configuration may be transmitted as a SIBi included in an RRC message (e.g., SystemInformation message), or a part of a SIBi included in an RRC message.

In one embodiment, the source cell may transmit an "Obtain Common Target Cell Configuration" indication via a broadcast channel (e.g., PCCH) to indicate multiple UEs to obtain the common target cell configuration. The "Obtain Common Target Cell Configuration" indication may be implemented by using 1 bit in the short message field for the indication of the system information modification, wherein the short message field may be transmitted on a PDCCH addressed to a P-RNTI. RRC_IDLE or RRC_INACTIVE UE may not need to obtain the common target cell configuration or may not need to store the parameters included in the common target cell configuration. In one embodiment, the "Obtain Common Target Cell Configuration" indication may be implemented by an indication in the system information scheduling information for indicating a specific SIB is available or is changed. An RRC_IDLE or RRC_INACTIVE UE may omit the indication.

In one embodiment the common target cell configuration may be transmitted for a SI modification period.

In one embodiment, the common target cell configuration may not include configuration associated with PDCP, RLC, or MAC protocols.

In one embodiment, the common target cell configuration may include information such as a UL/DL BWP ID (e.g., transition BWP ID), a serving cell configuration (e.g., ServingCellConfig) associated with the cell providing the transition SSB, a SSB frequency of target cell, a PCI of target cell, ephemeris information of target cell, common TA adjustment information (e.g., common TA parameters including Kmac, Koffset, or epoch time) associated with target cell, or a parameter $\text{Offset}_{s\_t}$, or a BWP transition period (or BA transition period). The SSB frequency of target cell may indicate the SSB frequency associated with target cell, and the SSB frequency may be associated with the DL BWP. The ephemeris information may be used by the UE to evaluate or adjust the timing advance value to access the target cell. If the ephemeris information is absent in the common target cell configuration and there is no valid ephemeris information associated with the target cell store in the UE, the UE may obtain the ephemeris information from system information of the target cell. If the common TA adjustment information is not provided by the common target cell configuration, the UE may estimate the common TA adjustment information according to the UE location and the ephemeris of the target cell. The parameter $\text{Offset}_{s\_t}$ is the timing difference between the source cell and the target cell. If $\text{Offset}_{s\_t}$ is not provided by the common target cell configuration, the UE may search the SSB of target cell blindly (i.e., without network provided assistance information). The BWP transition period may be in the form of a starting time and a validity period of time, or in the form of a duration (i.e., a starting time and a stopping time), wherein transition to the BA configuration associated with the target cell is allowed in the duration.

In one embodiment, the common target cell configuration may include a BWP recovery time $T_{BWP\_recover}$, wherein $T_{BWP\_recover}$ may indicate the time (e.g., in the form of SFN and subframe number of the target cell, or an timing offset value) for the UE to recover the BWP configuration (e.g., as UE specific BWP configuration if the UE specific BWP configuration is configured to the UE, or as the BWP configuration applied by the UE before the reception of "BA command"). The timing offset value mentioned above may be in a number of milliseconds, subframes, or slots. The recovery of BWP configuration may be implemented by applying the BWP configuration as UE specific BWP configuration or as the BWP configuration applied by the UE before the reception of "BA command".

In step S1303, the UE may switch to the indicated UL or DL BWP (e.g., BWP indicated by the BA command) according to the reception of the common target cell configuration. The UE may switch to the indicated UL or DL BWP by performing BA with re-synchronization procedure no earlier than the starting of transition period and no later than the stopping of the transition period (i.e., during transition period).

In one embodiment, the UE would take precedence of (i.e., apply) the value of the parameter configured by the BA configuration message if both the common target cell configuration and the BA configuration provide the value of the same parameter (e.g., RA resource configuration, TA adjustment information, or BWP transition period).

In one embodiment, the UE may not perform re-configuring or resetting of PDCP, RLC, or MAC protocols. That is, the UE may apply a BA command without conveying the configuration of PDCP, RLC, or MAC protocols.

In one embodiment, the UE may store the information of the transition BWP (e.g., transition BWP ID). If the indicated BWP is the transition BWP (i.e., the indicated BWP ID is equal to the transition BWP ID), the UE may perform DL timing re-synchronization with the transition DL BWP. That is, the UE may trigger BA with re-synchronization. The DL timing re-synchronization may be performed by monitoring SSB frequency as configured by the common target cell configuration message and synchronized to the SSS and PSS accordingly. The UE may perform a RA procedure in the transition UL BWP by utilizing the RACH resource associated with the transition UL and DL BWP, as step S1304 shown in FIG. 13.

In one embodiment, the UE may store the information of the transition BWP (e.g., transition BWP ID). If the indicated BWP is not the transition BWP (i.e., the indicated BWP ID is not equal to the transition BWP ID), the UE may switch to the indicated DL or UL BWP without performing the DL re-synchronization with the indicated DL BWP as well as without performing the RA procedure with the indicated UL BWP. That is, step S1304 as shown in FIG. 13 may be omitted by the UE.

In one embodiment, if both the downlink reference signal associated with the transition BWP and a configuration of SSB frequency provided by the Common Target Cell Configuration (e.g., the configuration for all the UEs) are configured to the UE, the UE may perform the re-synchronization procedure according to the downlink reference signal associated with the transition BWP.

In step S1305, the UE may consider the procedure (e.g., BA with re-synchronization) as successfully completed upon receiving the PDCCH addressed to the C-RNTI of the UE.

In step S1306, upon or after BWP recovery time (i.e., the time indicated by $T_{BWP\_recover}$), the UE may recover the BWP configuration, wherein the BWP configuration is the configuration applied by the UE before receiving the "BA command" message. If $T_{BWP\_recover}$ is configured as a timing offset value, the value of BWP recovery time may be calculated by ($T_{t\text{-}service}$+$T_{BWP\_recever}$), i.e., the time which is calculated by the time indicated by $T_{BWP\_recover}$ after the time the serving cells stop serving the area.

In one embodiment, the UE may perform an UL timing adjustment (e.g., by applying TA adjustment information associated with target cell, or by the UE location and the ephemeris of target cell) before performing any UL transmission to the target cell.

Figure 14:
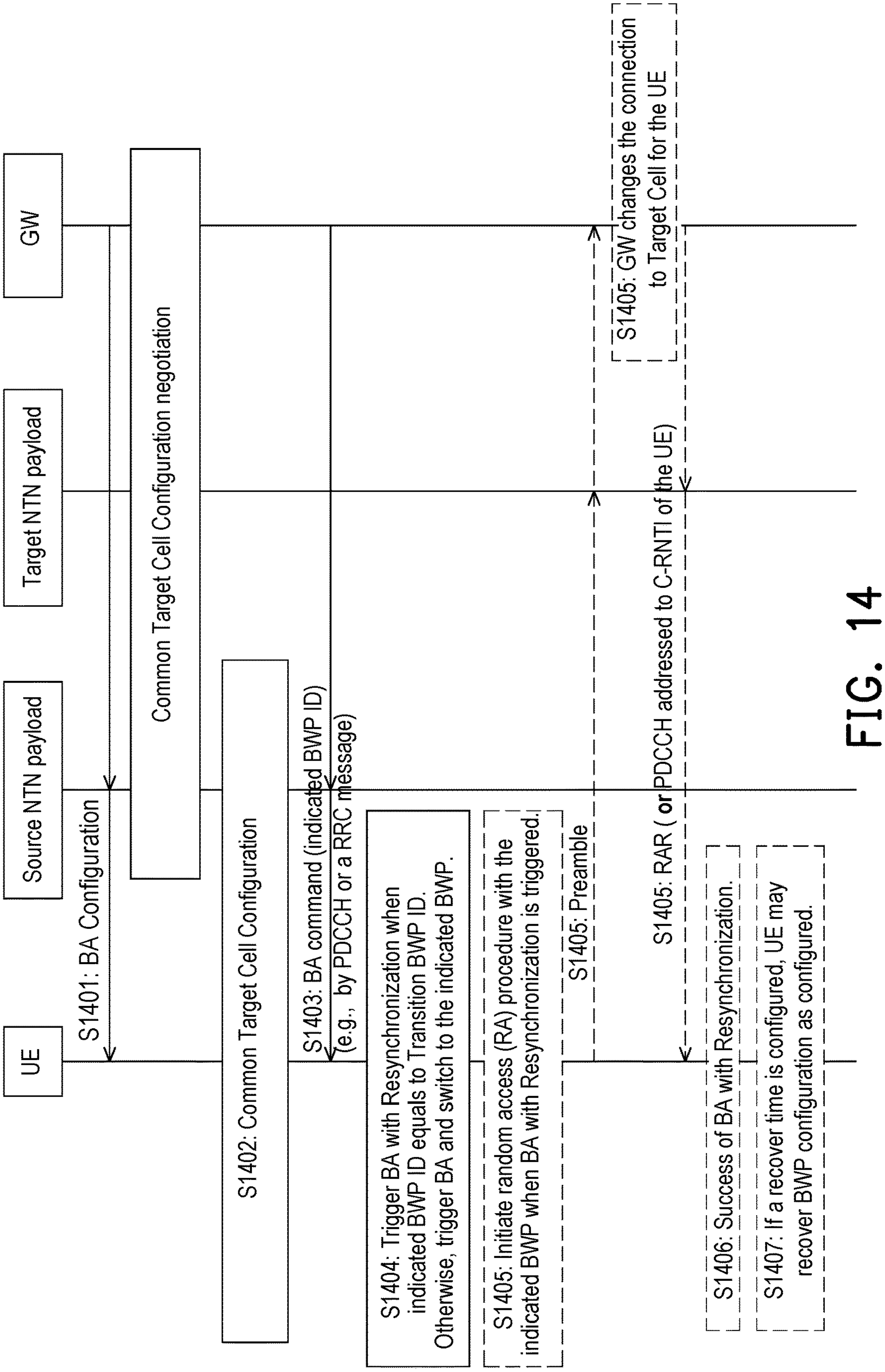
FIG. 14 illustrates a schematic diagram of triggering BA with re-synchronization by the reception of BA command message according to an embodiment of the present disclosure.

FIG. 14 illustrates a schematic diagram of triggering BA with re-synchronization by the reception of BA command message according to an embodiment of the present disclosure. In step S1401, the source cell may provide a BA configuration message (e.g., by RRCReconfiguration message) to the UE by a dedicated signaling (i.e., signaling dedicated to a specific UE). The BA configuration message may include one or more DL or UL BWP configuration (may include transition BWP configuration). Each BWP configuration may be associated with a BWP ID. Each BWP configuration may include a BWP ID, a frequency location and bandwidth of the BWP, or information of subcarrier space to be adopted in the BWP.

In one embodiment, the transition DL BWP configuration may include a BWP ID, a frequency location and bandwidth of the BWP, information of subcarrier space to be used in the BWP, a CORESET and search space for UE to monitor a RAR, or a CORESET and search space for UE to monitor a downlink reference signal (e.g., SSB frequency or CSI-RS) and a PDCCH associated with the transition BWP. The UE may perform the re-synchronization procedure to the target cell according to the downlink reference signal provided by the BA Configuration message if both the downlink reference signal associated with the transition BWP and the SSB frequency provided by the Common Target Cell Configuration are configured to the UE.

In one embodiment, the transition UL BWP configuration may include a BWP ID, a frequency location and bandwidth of the BWP, information of subcarrier space to be used in the BWP, resource configuration of a RACH including the resource for UE to transmit a preamble, or a pre-configured UL Tx resource (e.g., a resource configuration of PUCCH or PUSCH transmission).

In step S1402, the source cell may transmit a common target cell configuration to the UE by broadcast. The common target cell configuration may be transmitted as a SIBi included in an RRC message (e.g., SystemInformation message), or a part of a SIBi included in an RRC message.

In one embodiment, the source cell may transmit an "Obtain Common Target Cell Configuration" indication via a broadcast channel (e.g., PCCH) to indicate multiple UEs to obtain the common target cell configuration. The "Obtain Common Target Cell Configuration" indication may be implemented by using 1 bit in the short message field for the indication of the system information modification, wherein the short message field may be transmitted on a PDCCH addressed to a P-RNTI. RRC_IDLE or RRC_INACTIVE UE may not need to obtain the common target cell configuration or may not need to store the parameters included in the common target cell configuration. In one embodiment, the "Obtain Common Target Cell Configuration" indication may be implemented by an indication in the system information scheduling information for indicating a specific SIB is available or is changed. An RRC_IDLE or RRC_INACTIVE UE may omit the indication.

In one embodiment the common target cell configuration may be transmitted for a SI modification period.

In one embodiment, the common target cell configuration may include information such as a UL/DL BWP ID (e.g., transition BWP ID), a serving cell configuration (e.g., ServingCellConfig) associated with the cell providing the transition SSB, a SSB frequency of target cell, a PCI of target cell, ephemeris information of target cell, common TA adjustment information (e.g., common TA parameters including Kmac, Koffset, or epoch time) associated with target cell, or a parameter $Offset_{s\_t}$, or a BWP transition period (or BA transition period). The SSB frequency of target cell may indicate the SSB frequency associated with target cell, and the SSB frequency may be associated with the DL BWP. The ephemeris information may be used by the UE to evaluate or adjust the timing advance value to access the target cell. If the ephemeris information is absent in the common target cell configuration and there is no valid ephemeris information associated with the target cell store in the UE, the UE may obtain the ephemeris information from system information of the target cell. If the common TA adjustment information is not provided by the common target cell configuration, the UE may estimate the common TA adjustment information according to the UE location and the ephemeris of the target cell. The parameter $Offset_{s\_t}$ is the timing difference between the source cell and the target cell. If $Offset_{s\_t}$ is not provided by the common target cell configuration, the UE may search the SSB of target cell blindly (i.e., without network provided assistance information). The BWP transition period may be in the form of a starting time and a validity period of time, or in the form of a duration (i.e., a starting time and a stopping time), wherein transition to the BA configuration associated with the target cell is allowed in the duration.

In one embodiment, the common target cell configuration may include a BWP recovery time $T_{BWP\_recover}$, wherein $T_{BWP\_recover}$ may indicate the time (e.g., in the form of SFN and subframe number of the target cell, or an timing offset value) for the UE to recover the BWP configuration (e.g., as UE specific BWP configuration if the UE specific BWP configuration is configured to the UE, or as the BWP configuration applied by the UE before the reception of "BA command"). The timing offset value mentioned above may be in a number of milliseconds, subframes, or slots. The recovery of BWP configuration may be implemented by applying the BWP configuration as UE specific BWP configuration or as the BWP configuration applied by the UE before the reception of "BA command".

In step S1403, the source cell may indicate the UE to perform BA with re-synchronization by a "BA command" message with a re-synchronization indication (i.e., ResyncIndication) parameter. The "BA command" message may be transmitted by a dedicated signaling to a UE (e.g., by a PDCCH addressed to C-RNTI of the UE, or by an RRC message). The BA command message may not include configuration associated with PDCP, RLC, or MAC protocols.

In one embodiment, the BA command message may include information such as a DL BWP ID associated with the DL BWP to be activated, a UL BWP ID associated with the UL BWP to be activated, a UE specific BWP configuration including a configuration of UE specific UL and/or DL BWPs, a RA resource configuration associated with target cell (e.g., dedicated RA parameters RACH-ConfigDedicated), a serving cell configuration (e.g., ServingCellConfig) associated with the cell providing the transition SSB, a C-RNTI associated with target cell, or a random backoff time $T_{RA\text{-}backoff}$ of initiating a RA attempt. The serving cell configuration may be a UE specific serving cell configuration to be applied by a UE after the UE successfully completing the RA procedure with the target cell. If the C-RNTI associated with target cell is not provided by the specific target cell configuration, the UE may reuse the C-RNTI provided by the source cell.

In step S1404, the UE may switch to the indicated UL or DL BWP (e.g., BWP indicated by the BA command) upon the reception of the BA command. The UE would take precedence of (i.e., apply) the value of the parameter configured by the BA command message if both the common target cell configuration and the BA command provide the value of the same parameter (e.g., RA resource configuration, TA adjustment information, or BWP transition period).

In one embodiment, the UE may not perform re-configuring or resetting of PDCP, RLC, or MAC protocols. That is, the UE may apply a BA command without conveying the configuration of PDCP, RLC, or MAC protocols.

In one embodiment, the UE may store the information of the transition BWP (e.g., transition BWP ID). If the indicated BWP is the transition BWP (i.e., the indicated BWP ID is equal to the transition BWP ID), the UE may perform DL timing re-synchronization with the transition DL BWP. That is, the UE may trigger BA with re-synchronization. The DL timing re-synchronization may be performed by monitoring SSB frequency as configured by the common target cell configuration message and synchronized to the SSS and PSS accordingly. The UE may perform a RA procedure in the transition UL BWP by utilizing the RACH resources associated with the transition UL and DL BWP, as step S1405 shown in FIG. 14.

In one embodiment, the UE may store the information of the transition BWP (e.g., transition BWP ID). If the indicated BWP is not the transition BWP (i.e., the indicated BWP ID is not equal to the transition BWP ID), the UE may switch to the indicated DL or UL BWP without performing the DL re-synchronization with the indicated DL BWP as well as without performing the RA procedure with the indicated UL BWP. That is, step S1405 as shown in FIG. 14 may be omitted by the UE.

In one embodiment, if both the downlink reference signal associated with the transition BWP and a configuration of SSB frequency provided by the Common Target Cell Configuration (e.g., the configuration for all the UEs) are configured to the UE, the UE may perform the re-synchronization procedure according to the downlink reference signal associated with the transition BWP.

In step S1406, the UE may consider the procedure (e.g., BA with re-synchronization) triggered by the BA command as successfully completed upon receiving the PDCCH addressed to the C-RNTI of the UE.

In one embodiment, upon the starting of a transition period, the UE may perform DL and/or UL synchronization with the target cell. If the UE has been configured with transition BWP, the active BWP of a UE is not the transition BWP (i.e., the indicated BWP ID is not equal to the transition BWP ID), and the timing difference between the UE measured current time and the stopping time of the transition period is less than a threshold $T_{tranisition\_threshold}$ (i.e., stopping time of transition period−UE measured current time<$T_{transition\_threshold}$), the UE may switch to the transition BWP and performing the DL and/or UL re-synchronization with the target cell. If the UE has been configured with the transition BWP, the active BWP of a UE is the transition BWP (i.e., the indicated BWP ID is equal to the transition BWP ID), and the timing difference between the UE measured current time and the stopping time of the transition period is less than a threshold $T_{transition\_threshold}$, the UE may perform the DL and/or UL re-synchronization with the target cell by utilizing the active DL and/or UL BWP.

In step S1407, upon or after BWP recovery time (i.e., the time indicated by $T_{BWP\_recover}$), if UE specific BWP configuration and $T_{BWP\_recover}$ are configured, the UE may apply BWP configuration (e.g., UE specific BWP configuration) upon or after $T_{BWP\_recover}$. If UE specific BWP configuration is not configured and $T_{BWP\_recover}$ is configured, the UE may recover the BWP configuration, wherein the BWP configuration is the configuration applied by the UE before receiving the "BA command" message. If $T_{BWP\_recover}$ is configured as a timing offset value, the value of BWP recovery time may be calculated by ($T_{t\text{-}service}$+$T_{BWP\_recever}$), i.e., the time which is calculated by the time indicated by $T_{BWP\_recover}$ after the time the serving cells stop serving the area.

In one embodiment, the UE may perform an UL timing adjustment (e.g., by applying TA adjustment information associated with target cell, or by the UE location and the ephemeris of target cell) before performing any UL transmission to the target cell.

Figure 15:
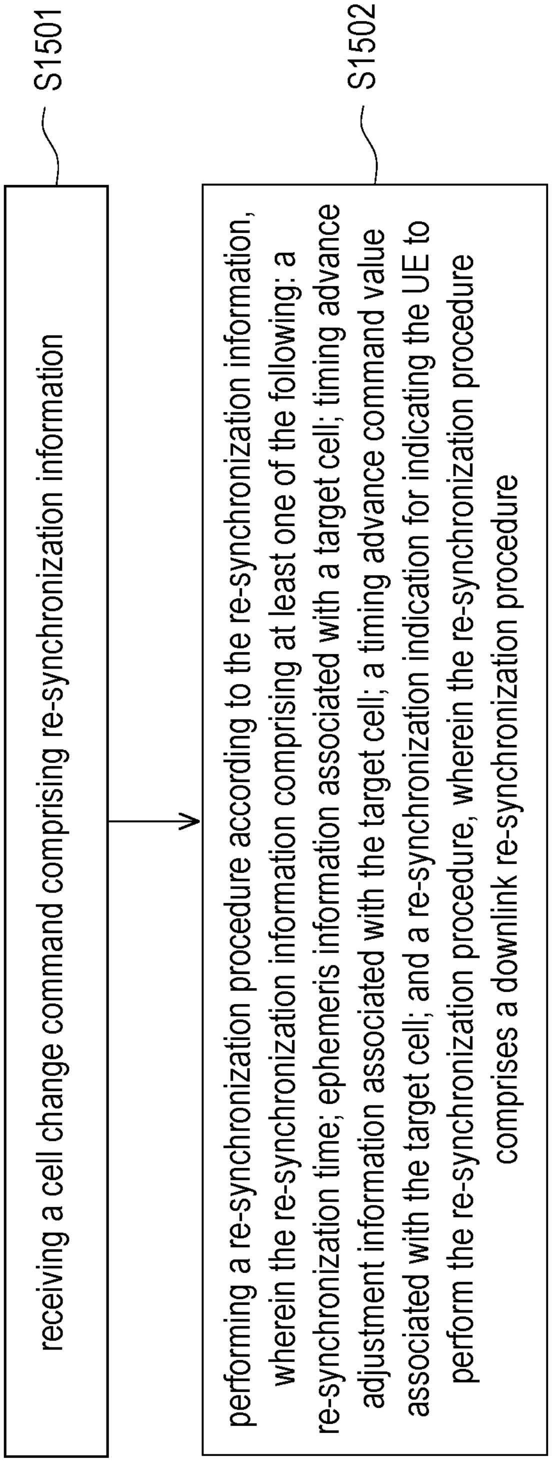
FIG. 15 illustrates a flowchart of a method of NTN communication according to an embodiment of the present disclosure.

FIG. 15 illustrates a flowchart of a method of NTN communication according to an embodiment of the present disclosure, wherein the method may be implemented by a UE. In step S1501, receiving a cell change command comprising re-synchronization information. In step S1502, performing a re-synchronization procedure according to the re-synchronization information, wherein the re-synchronization information comprising at least one of the following: a re-synchronization time; ephemeris information associated with a target cell; timing advance adjustment information associated with the target cell; a timing advance command value associated with the target cell; and a re-synchronization indication for indicating the UE to perform the re-synchronization procedure, wherein the re-synchronization procedure comprises a downlink re-synchronization procedure.

Figure 16:
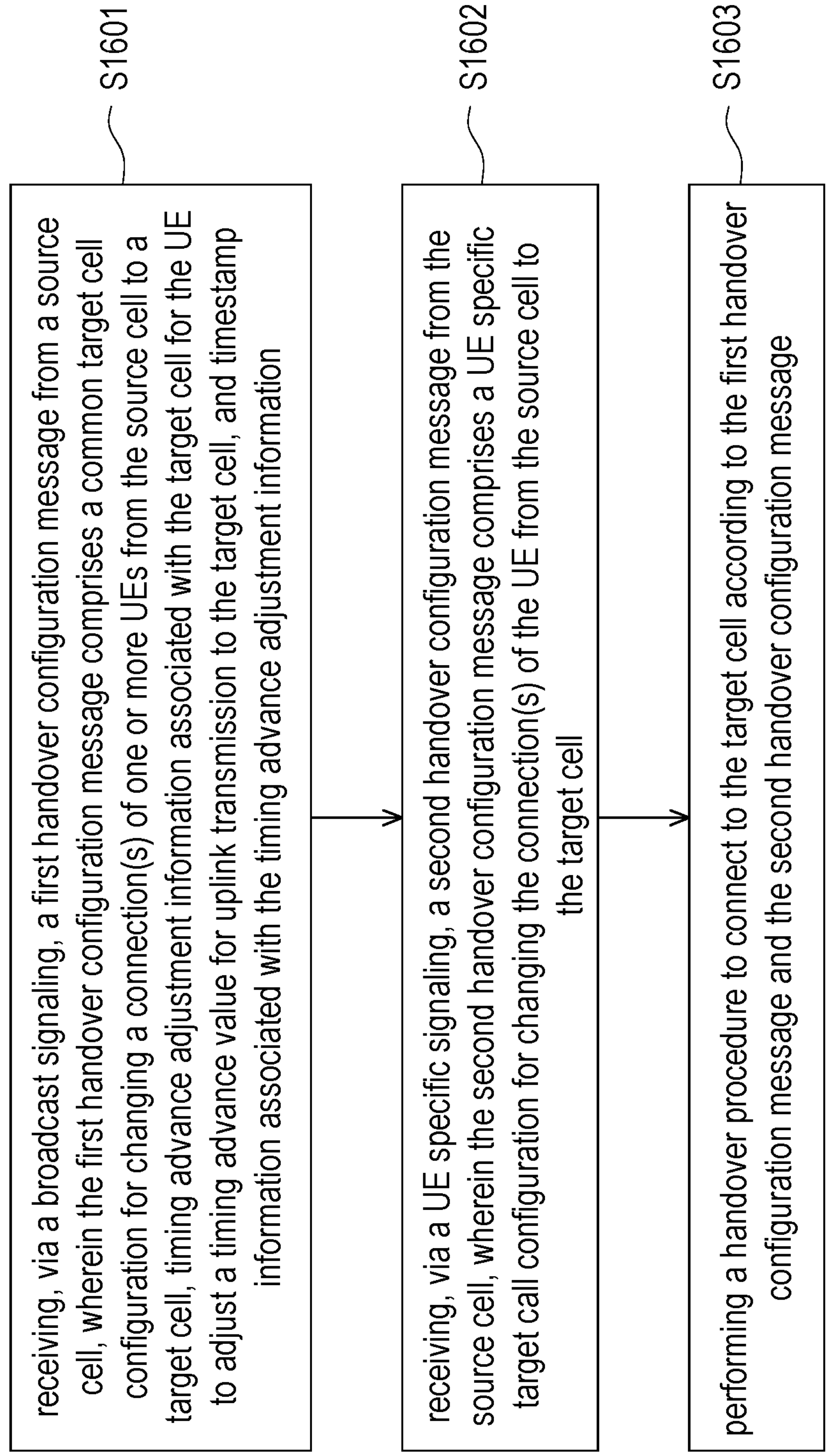
FIG. 16 illustrates a flowchart of a method of NTN communication according to an embodiment of the present disclosure.

FIG. 16 illustrates a flowchart of a method of NTN communication according to an embodiment of the present disclosure, wherein the method may be implemented by a UE. In step S1601, receiving, via a broadcast signaling, a first handover configuration message from a source cell, wherein the first handover configuration message comprises a common target cell configuration for changing the connection(s) of one or more UEs from the source cell to a target cell, timing advance adjustment information associated with the target cell for the UE to adjust a timing advance value for uplink transmission to the target cell, and timestamp information associated with the timing advance adjustment information. In step S1602, receiving, via a UE specific signaling, a second handover configuration message from the source cell, wherein the second handover configuration message comprises a UE specific target call configuration for changing the connection(s) of the UE from the source cell to the target cell. In step S1603, performing a handover procedure to connect to the target cell according to the first handover configuration message and the second handover configuration message.

Figure 17:
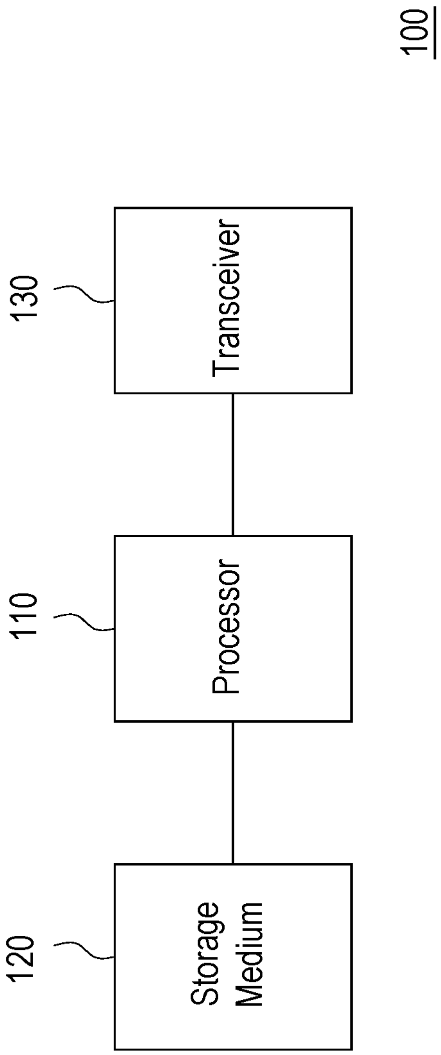
FIG. 17 illustrates a schematic diagram of a UE according to an embodiment of the present disclosure.

FIG. 17 illustrates a schematic diagram of a UE 100 according to an embodiment of the present disclosure, wherein the methods as shown in FIG. 1 to FIG. 16 may be implemented by the UE 100.

The UE 100 may include a processor 110, a storage medium 120, and a transceiver 130. The processor 110 is coupled to the storage medium 120 and the transceiver 140 and is configured to access and execute a plurality of modules stored in the storage medium 120.

The processor 110 could be implemented by using programmable units such as a micro-processor, a micro-controller, a DSP chip, a field programmable gate array (FPGA), and so forth. The functions of the processor 110 may also implemented with separated electronic devices or ICs.

The storage medium 120 may be, for example, any type of fixed or removable random access memory (RAM), a read-only memory (ROM), a flash memory, a hard disk drive (HDD), a solid state drive (SSD) or similar element, or a combination thereof, configured to record a plurality of modules or various applications executable by the processor 110.

The transceiver 130 may be configured to transmit or receive signals. The transceiver 130 may also perform operations such as low noise amplifying, impedance matching, frequency mixing, up or down frequency conversion, filtering, amplifying, and so forth. The transceiver 130 may include one or more digital-to-analog (D/A) converters or analog-to-digital (A/D) converters which are configured to convert from an analog signal format to a digital signal format during uplink signal processing and from a digital signal format to an analog signal format during downlink signal processing.

In view of the aforementioned descriptions, the source cell of the present disclosure may pre-configure, for all the UEs, the target cell information which is suitable for all the UEs by the broadcast signaling, so as to reduce the control signaling overhead of handover configuration caused by bursty handover. The source cell may transmit a UE specific signaling to a UE to indicate a preferable handover occasion for the UE to avoid UL transmission collisions caused by bursty handover. A handover configuration may indicate the UE the information for performing DL or UL synchronization, wherein the DL or UL synchronization may reduce the HO interruption time for the UE. When the serving time or area of the source cell and the serving time or area of the target cell are overlapped, the present disclosure may utilize a BWP pre-configuration and BA mechanism instead of the traditional handover procedure, so as to reduce the HO interruption time for changing the connection(s) of the UE from the source cell to the target cell.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method of non-terrestrial network communication, adapted to a user equipment (UE), wherein the method comprising:
- receiving a cell change command comprising re-synchronization information; and
- performing a re-synchronization procedure according to the re-synchronization information, wherein the re-synchronization information comprising at least one of the following: a re-synchronization time; ephemeris information associated with a target cell; timing advance adjustment information associated with the target cell; a timing advance command value associated with the target cell; and a re-synchronization indication for indicating the UE to perform the re-synchronization procedure, wherein the re-synchronization procedure comprises a downlink re-synchronization procedure,
- wherein performing the re-synchronization procedure according to the re-synchronization information comprises:
  - performing the downlink re-synchronization procedure according to an indicated downlink reference signal, wherein the indicated downlink reference signal is received no earlier than the re-synchronization time indicated by the re-synchronization information.

2. The method of claim 1, wherein the re-synchronization time comprising at least one of the following:
- a configuration for a timer, a starting time, a starting time and a time period, and a starting time and a stopping time.

3. The method of claim 1, wherein the cell change command is transmitted to the UE via one of a broadcast signaling and a dedicated signaling for the UE.

4. The method of claim 1, wherein the re-synchronization information further comprises a configuration of downlink reference signal, wherein performing the re-synchronization procedure according to the re-synchronization information comprising one of the following:
- upon receiving the re-synchronization information, performing the downlink re-synchronization procedure according to a configuration of downlink reference signal indicated by the re-synchronization information, and the configuration of downlink reference signal indicated by the re-synchronization information is an indicated downlink reference signal; and
- in response to the re-synchronization information comprising a re-synchronization indication, performing the downlink re-synchronization procedure according to a downlink reference signal associated with a serving cell, and the downlink reference signal associated with the serving cell is an indicated downlink reference signal.

5. The method of claim 1, wherein the re-synchronization information further comprises a configuration of downlink reference signal, wherein performing the re-synchronization procedure according to the re-synchronization information comprising:
- monitoring a synchronization signal block according to a configuration of downlink reference signal indicated by the re-synchronization information so as to be downlink synchronized in time domain and frequency domain based on a primary synchronization signal and a secondary synchronization signal of the synchronization signal block.

6. The method of claim 1, wherein performing the re-synchronization procedure further comprising:
- performing an uplink re-synchronization procedure after completing a downlink re-synchronization procedure.

7. The method of claim 6, wherein the re-synchronization information further comprises a configuration of downlink reference signal, wherein performing the uplink re-synchronization procedure comprising at least one of the following:

performing a random access procedure according to a random access resource associated with a downlink reference signal; and sending an uplink signal through a physical uplink control channel or a physical uplink shared channel according to a configuration associated with the downlink reference signal.

8. The method of claim 6, wherein performing the re-synchronization procedure comprising at least one of the following:

stopping performing a beam failure detection associated with a source cell and a target cell correspondingly; and stopping performing a radio link failure detection associated with the source cell and the target cell correspondingly.

9. The method of claim 1, further comprising:

receiving a bandwidth adaptation configuration before receiving the cell change command.

10. The method of claim 9, wherein the bandwidth adaptation configuration comprising at least one of the following:

a transition bandwidth part configuration; a configuration of downlink reference signal associated with a transition bandwidth part, wherein the configuration of downlink reference signal indicates a frequency and time location and subcarrier spacing associated with a downlink reference signal; a bandwidth part identifier; a bandwidth part recovery time; a timing difference between a serving cell and a target cell; a serving cell configuration; a cell radio network temporary identifier of the UE; and a UE specific bandwidth part configuration comprising at least one of a configuration of downlink bandwidth part and a configuration of uplink bandwidth part.

11. The method of claim 10, wherein performing the re-synchronization procedure according to the re-synchronization information comprising:

in response to both the configuration of downlink synchronization signal associated with the transition bandwidth part and a configuration of downlink reference signal included in the cell change command being configured to the UE, performing the re-synchronization procedure according to the configuration of downlink reference signal associated with the transition bandwidth part.

12. The method of claim 11, wherein performing the re-synchronization procedure according to the re-synchronization information comprising: performing the re-synchronization procedure according to the configuration of downlink reference signal included in the cell change command, applying the bandwidth part configuration associated with the bandwidth part identifier indicated in the bandwidth adaptation configuration if the UE performing the re-synchronization procedure according to the configuration of downlink reference signal included in the cell change command.

13. The method of claim 10, wherein the transition bandwidth part configuration comprises a configuration of downlink transition bandwidth part and a configuration of uplink transition bandwidth part.

14. The method of claim 13, wherein the configuration of downlink transition bandwidth part comprising at least one of the following:

a bandwidth part identifier; a frequency location and a bandwidth of a bandwidth part, wherein the bandwidth part is configured to use a subset of the total cell bandwidth of the corresponding cell; information of subcarrier space to be adopted in a bandwidth part; a control resource set for monitoring a random access response; a control resource set for monitoring a physical downlink control channel, and a control resource set for monitoring a physical downlink shared channel.

15. The method of claim 13, wherein the configuration of uplink transition bandwidth part comprising at least one of the following:

a bandwidth part identifier; a frequency location and a bandwidth of a bandwidth part; information of subcarrier space to be adopted in a bandwidth part; a resource configuration of random access channel for transmitting a preamble; a resource configuration of physical uplink control channel transmission; and a resource configuration of physical uplink shared channel transmission.

16. The method of claim 10, wherein performing the re-synchronization procedure according to the re-synchronization information comprising: applying the transition bandwidth part configuration after performing the re-synchronization procedure according to the configuration of downlink reference signal associated with the transition bandwidth part if the UE performing the re-synchronization procedure according to the configuration of downlink reference signal associated with the transition bandwidth part.

17. The method of claim 10, wherein performing the re-synchronization procedure according to the re-synchronization information comprising: performing the re-synchronization procedure according to configuration of downlink reference signal associated with the bandwidth part identifier indicated in the bandwidth adaptation configuration, applying the bandwidth part configuration associated with the bandwidth part identifier indicated in the bandwidth adaptation configuration.

18. The method of claim 9, further comprising one of the following:

applying a bandwidth part configuration before performing the re-synchronization procedure, and resuming the bandwidth part configuration after completing the re-synchronization procedure according to a bandwidth part recovery time indicated by the bandwidth adaptation configuration, wherein the resuming may be implemented by storing the bandwidth part configuration which is applied before performing the re-synchronization procedure and applying the stored bandwidth part configuration after the bandwidth part recovery time;

applying the bandwidth part configuration before performing the re-synchronization procedure, and resuming the bandwidth part configuration after receiving a physical downlink control channel addressed to a cell radio network temporary identifier of the UE, wherein the cell radio network temporary identifier is associated with a cell corresponding to the configuration of downlink reference signal indicated by the bandwidth adaptation configuration;

applying a UE specific bandwidth part configuration according to the bandwidth part recovery time indicated by the bandwidth adaptation configuration; and applying the UE specific bandwidth part configuration after receiving the physical downlink control channel addressed to the cell radio network temporary identifier of the UE, wherein the cell radio network temporary identifier is associated with the cell corresponding to the configuration of downlink reference signal indicated by the bandwidth adaptation configuration.

19. The method of claim 1, further comprising:

receiving a common target cell configuration before receiving the cell change command.

20. The method of claim 19, wherein the common target cell configuration comprising at least one of the following:

a synchronization signal block frequency associated with a target cell; a physical cell identifier of a target cell; a configuration of downlink reference signal associated with a downlink bandwidth part; a bandwidth part identifier; a bandwidth part recovery time; and a timing difference between a serving cell and a target cell.

21. The method of claim 20, wherein performing the re-synchronization procedure according to the re-synchronization information comprising one of the following:

in response to both the synchronization signal block frequency associated with a target cell and a configuration of downlink reference signal associated with a downlink bandwidth part, performing the re-synchronization procedure according to the configuration of downlink reference signal associated with a downlink bandwidth part; and in response to the bandwidth part identifier and a timing difference between a UE measured current time and a stopping time of a transition period being less than a threshold, performing the re-synchronization procedure according to the bandwidth part identifier.

22. A method of non-terrestrial network communication, adapted to a user equipment (UE), wherein the method comprising:

receiving, via a broadcast signaling, a first handover configuration message from a source cell, wherein the first handover configuration message comprises a common target cell configuration for changing a connection of one or more UEs from the source cell to a target cell, timing advance adjustment information associated with the target cell for the UE to adjust a timing advance value for uplink transmission to the target cell, and timestamp information associated with the timing advance adjustment information;

receiving, via a UE specific signaling, a second handover configuration message from the source cell, wherein the second handover configuration message comprises a UE specific target call configuration for changing the connection of the UE from the source cell to the target cell;

performing a handover procedure to connect to the target cell according to the first handover configuration message and the second handover configuration message; and performing one of the following:

applying a bandwidth part configuration before performing the handover procedure, and resuming the bandwidth part configuration upon a bandwidth part recovery time indicated by the first handover configuration message; and applying the bandwidth part configuration before performing the handover procedure, and resuming the bandwidth part configuration after receiving a physical downlink control channel addressed to a cell radio network temporary identifier of the UE, wherein the cell radio network temporary identifier is associated with the target cell.

23. The method of claim 22, wherein the first handover configuration message comprising at least one of the following:

ephemeris information of the target cell, wherein the ephemeris information comprises ephemeris of a satellite embarking a network device of non-terrestrial network to provide non-terrestrial network functions of a non-terrestrial network cell; and a timing difference between the source cell and the target cell.

24. The method of claim 22, wherein the second handover configuration message comprising at least one of the following:

a random access resource configuration, a random backoff time of initiating an uplink transmission of a random access procedure to the target cell; a timing advance adjustment value for the UE; a serving cell configuration for the UE; and the cell radio network temporary identifier.

25. The method of claim 24, wherein the second handover configuration message further comprises a handover time for the handover procedure, wherein the handover time is indicated by s system frame number and a subframe number.

26. The method of claim 22, wherein performing the handover procedure comprising one of the following:

performing the handover procedure upon receiving the second handover configuration message;

performing the handover procedure upon a handover time in response to the handover time being indicated by the second handover configuration message; and performing the handover procedure according to a random backoff time in response to the random backoff time being indicated by the second handover configuration message.

27. The method of claim 22, wherein performing the handover procedure comprising:

receiving, via a broadcast signaling or a unicast signaling, a handover indication from the source cell, wherein the handover indication is used for change the connection of one or more UEs from the source cell to the target cell; and performing the handover procedure upon receiving the handover indication.

28. The method of claim 22, wherein the first handover configuration message comprising at least one of the following:

a timing difference between the source cell and the target cell; a transition bandwidth part identifier; a synchronization signal block frequency associated with a transition bandwidth part; a downlink bandwidth part identifier associated with the target cell; a uplink bandwidth part identifier associated with the target cell; a bandwidth part transition period; and the bandwidth part recovery time.

29. The method of claim 22, further comprising one of the following:

performing a bandwidth adaptation with synchronization according to the first handover configuration message;

performing a bandwidth adaptation with synchronization according to a starting time of a transition period; and performing the bandwidth adaptation with synchronization according to a bandwidth part transition period.

30. The method of claim 29, wherein the bandwidth adaptation with synchronization comprises a downlink frequency and timing synchronization with a downlink bandwidth part indicated by the first handover configuration message.

31. The method of claim 22, further comprising:

performing an uplink synchronization via a random access procedure on an uplink bandwidth part by utilizing a random access resource associated with the uplink bandwidth part.

32. The method of claim 22, wherein the second handover configuration message comprises re-synchronization information, and the re-synchronization information comprises a re-synchronization indication for a re-synchronization procedure between the UE and the target cell.

33. The method of claim 32, further comprising one of the following:

upon receiving the second handover configuration message, performing the re-synchronization procedure, wherein the re-synchronization procedure is a downlink re-synchronization procedure;

performing the re-synchronization procedure according to a downlink reference signal, wherein the downlink reference signal is received no earlier than a re-synchronization time indicated by the re-synchronization information; and upon receiving the second handover configuration message, performing the re-synchronization procedure, wherein the re-synchronization procedure comprises an uplink re-synchronization procedure.

34. The method of claim 33, wherein the uplink re-synchronization procedure comprising one of the following:

performing a random access procedure associated with the target cell; and sending an uplink signal through a physical uplink control channel or a physical uplink shared channel to the target cell.

35. The method of claim 34, wherein sending the uplink signal comprising:

sending the uplink signal via an uplink resource, wherein the uplink resource is configured before the UE completing a downlink synchronization procedure with the target cell.

36. The method of claim 35, wherein the uplink resource is configured by a physical downlink control channel indication from the target cell.

37. A user equipment (UE), comprising:

a transceiver; and a processor, coupled to the transceiver and configured to:

receive a cell change command comprising re-synchronization information; and perform a re-synchronization procedure according to the re-synchronization information, wherein the re-synchronization information comprising at least one of the following: a re-synchronization time; ephemeris information associated with a target cell; timing advance adjustment information associated with the target cell; a timing advance command value associated with the target cell; and a re-synchronization indication for indicating the UE to perform the re-synchronization procedure, wherein the re-synchronization procedure comprises a downlink re-synchronization procedure, wherein performing the re-synchronization procedure according to the re-synchronization information comprises:

performing the downlink re-synchronization procedure according to an indicated downlink reference signal, wherein the indicated downlink reference signal is received no earlier than the re-synchronization time indicated by the re-synchronization information.

38. A user equipment (UE), comprising:

a transceiver; and a processor, coupled to the transceiver and configured to:

receive, via a broadcast signaling, a first handover configuration message from a source cell, wherein the first handover configuration message comprises a common target cell configuration for changing the connection of one or more UEs from the source cell to a target cell, timing advance adjustment information associated with the target cell for the UE to adjust a timing advance value for uplink transmission to the target cell, and timestamp information associated with the timing advance adjustment information;

receive, via a UE specific signaling, a second handover configuration message from the source cell, wherein the second handover configuration message comprises a UE specific target cell configuration for changing the connection of the UE from the source cell to the target cell; and perform a handover procedure to connect to the target cell according to the first handover configuration message and the second handover configuration message; and performing one of the following:

applying a bandwidth part configuration before performing the handover procedure, and resuming the bandwidth part configuration upon a bandwidth part recovery time indicated by the first handover configuration message; and applying the bandwidth part configuration before performing the handover procedure, and resuming the bandwidth part configuration after receiving a physical downlink control channel addressed to a cell radio network temporary identifier of the UE, wherein the cell radio network temporary identifier is associated with the target cell.

* * * * *